United States Patent
Sato

(10) Patent No.: US 6,697,219 B1
(45) Date of Patent: Feb. 24, 2004

(54) THIN FILM MAGNETIC HEAD CAPABLE OF REDUCING INDUCTANCE AND MANUFACTURING METHOD THEREFOR

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 412 days.

(21) Appl. No.: 09/679,654

(22) Filed: Oct. 4, 2000

(30) Foreign Application Priority Data

Oct. 6, 1999 (JP) .......................................... 11-285605

(51) Int. Cl.[7] ................................................. G11B 5/31
(52) U.S. Cl. ...................................................... 360/126
(58) Field of Search ................................. 360/317, 126

(56) References Cited

U.S. PATENT DOCUMENTS

| | | |
|---|---|---|
| 4,878,290 A | 11/1989 | Masud et al. |
| 5,245,493 A | 9/1993 | Kawabe et al. |
| 6,032,353 A | 3/2000 | Hiner et al. |
| 6,091,582 A * | 7/2000 | Komuro et al. .............. 360/126 |
| 6,130,809 A * | 10/2000 | Santini ......................... 360/317 |
| 6,226,149 B1 * | 5/2001 | Dill et al. .................... 360/126 |
| 6,430,003 B1 * | 8/2002 | Sasaki .......................... 360/126 |
| 6,466,401 B1 * | 10/2002 | Hong et al. .................. 360/123 |
| 6,466,404 B1 * | 10/2002 | Crue et al. ................... 360/126 |
| 6,483,664 B2 * | 11/2002 | Kamijima .................... 360/126 |
| 6,504,678 B1 * | 1/2003 | Kamijima .................... 360/126 |

* cited by examiner

Primary Examiner—David L. Ometz
(74) Attorney, Agent, or Firm—Brinks Hofer Gilson & Lione

(57) ABSTRACT

A thin film magnetic head is capable of reducing inductance by shortening a magnetic path, and also preventing a cavity from being formed in a coil insulating layer. The coil insulating layer is deposited on a lower core layer and at the rear of a recording portion, and a coil forming groove is formed in the coil insulating layer. Then, a coil layer is embedded in the coil forming groove. With this arrangement, bulges of the layers from an upper surface of the recording portion can be decreased so as to shorten a magnetic path.

10 Claims, 16 Drawing Sheets

THIN FILM MAGNETIC HEAD CAPABLE OF REDUCING INDUCTANCE AND MANUFACTURING METHOD THEREFOR

BACKGROUND OF THE INVENTION

1. Field of the Invention

The present invention relates to a recording thin film magnetic head used with, for example, a flying magnetic head and, more particularly, to a thin film magnetic head adapted to reduce inductance and capable of handling higher recording frequencies, and a manufacturing method for the same.

2. Description of the Related Art

FIG. 27 is a partial front view showing a construction of a conventional thin film magnetic head or inductive head, and FIG. 28 is a partial sectional view of the thin film magnetic head cut along the line XXVIII—XXVIII shown in FIG. 27 and viewed from the direction of an arrow.

Reference numeral 1 shown in FIGS. 27 and 28 denotes a lower core layer formed of a magnetic material, such as Permalloy. An insulating layer 9 is deposited on the lower core layer 1.

The insulating layer 9 includes a groove 9a having an inner width represented by a track width Tw, the groove 9a extending in a height direction or Y direction in the drawing, from a surface facing a recording medium (hereinafter referred to as "ABS" which stands for air bearing surface).

In the groove 9a, a lower magnetic pole layer 3 magnetically connected to the lower core layer 1, a gap layer 46, and an upper magnetic pole layer 5 magnetically connected to an upper core layer 48 are deposited by sequentially plating in this order from bottom.

Referring to FIG. 28, a spirally formed coil layer 7 is provided on the insulating layer 9 in a portion in the height direction or the Y direction in the drawing from the groove 9a formed in the insulating layer 9.

The coil layer 7 is covered by a coil insulating layer 47 formed of a resist or the like, and an upper core layer 48 is deposited on the coil insulating layer 47. The upper core layer 48 is magnetically connected with the upper magnetic pole layer 5 at a distal end portion 48a and also magnetically connected to the lower core layer 1 at a proximal end portion 48b.

In the inductive head shown in FIGS. 27 and 28, when recording current is supplied to the coil layer 7, a recording field is induced in the lower core layer 1 and the upper core layer 48. Magnetic signals are recorded in a recording medium, such as a hard disc, by a leakage field from between the lower magnetic pole layer 3 magnetically connected to the lower core layer 1 and the upper magnetic pole layer 5 magnetically connected to the upper core layer 48.

In the inductive head shown in FIGS. 27 and 28, a lower magnetic pole layer 3 locally formed over the track width Tw, the gap layer 46, and the upper magnetic pole layer 5 are provided in the vicinity of the surface facing the recording medium. This type of inductive head permits a narrower track.

The following will describe a manufacturing method for the inductive head shown in FIGS. 27 and 28. First, the insulating layer 9 is deposited on the lower core layer 1, then the groove 9a having the track width Tw is formed in the insulating layer 9 for a predetermined length in the height direction (depth direction) from the surface facing the recording medium (air bearing surface).

In the groove 9a, the lower magnetic pole layer 3, the gap layer 46, and the upper magnetic pole layer 5 are continuously plated, then the coil layer 7 is pattern-deposited on a portion of the insulating layer 9 that is located behind (in the height direction) from the groove 9a formed in the insulating layer 9.

The coil layer 7 is covered by a coil insulating layer 47, and the upper core layer 48 is formed from the top of the upper magnetic pole layer 5 to cover the coil insulating layer 47 by the flame plating process. This completes the inductive head shown in FIGS. 27 and 28.

For a trend toward higher recording densities and higher recording frequencies, it is necessary to reduce a track width and the inductance of an inductive head.

In order to reduce inductance, a magnetic path formed via the upper core layer 48 from the lower core layer 1 must be made shorter. This requires that a width T1 of the coil layer 7 formed from the distal end portion 48a to the proximal end portion 48b of the upper core layer 48 be reduced. Reducing the width T1 of the coil layer 7 allows the upper core layer 48 to be shortened so as to achieve a shorter magnetic path.

A method for forming the coil layer 7 by two layers could be applied to decrease the width T1 of the coil layer 7 without changing the number of turns of the coil layer 7.

In the construction of the thin film magnetic head shown in FIGS. 27 and 28, however, the magnetic path cannot be made sufficiently shorter to be able to handle higher recording frequencies in the future merely by providing the coil layer 7 with the double-layer construction. This makes it difficult to achieve an appropriate reduction in inductance.

A reason for the difficulty mentioned above is that the coil layer 7 is deposited on the insulating layer 9 having a thick film. Referring to FIG. 27, the insulating layer 9 has a film thickness H5, and the film thickness H5 is larger than or substantially identical to a total film thickness H6 of the lower magnetic pole layer 3, the gap layer 46, and the upper magnetic pole layer 5. Therefore, as shown in FIG. 28, when a junction surface between the upper magnetic pole layer 5 and the upper core layer 48 is defined as a reference plane, the coil layer 7 deposited on the insulating layer 9 is positioned more closely to the upper core layer 48 than the reference plane.

Hence, adopting the double-layer construction directly to the coil layer 7 would lead to an extremely large height from the upper surface of the lower core layer 1 to the upper surface of the coil insulating layer 47 covering the coil layer 7 even though the width T1 of the coil layer 7 can be reduced. As a result, the magnetic path cannot be shortened much, making it impossible to accomplish an appropriate reduction in inductance.

If the double-layer construction is simply applied to the coil layer 7 in the inductive head having the construction illustrated in FIG. 28, then a thickness H1 of the coil insulating layer 47 covering the coil layer 7 increases, resulting in an extremely large bulge of the coil insulating layer 47 when the upper surface of the upper magnetic pole layer 5 is defined as the reference plane.

Accordingly, it becomes difficult to pattern-form the upper core layer 48 from above the upper magnetic pole layer 5 to cover the coil insulating layer 47 by the flame plating process, posing a problem in that a portion in the vicinity of the distal end portion 48a of the upper core layer 48 cannot be formed into a predetermined shape.

If the width T2 of each conductor of the coil layer 7 is decreased, and a height H2 of each conductor is increased, then there should be no change in the volume of the coil layer, thus avoiding an increase in a coil resistance value. Furthermore, in this case, since the width T2 of each conductor can be reduced, the width T1 of the entire coil layer 7 can be reduced, permitting a further reduction in inductance by making a magnetic path even shorter.

On the other hand, however, another problem arises in that the increased height H2 of each conductor inevitably leads to an even larger bulge of the coil insulating layer 47 covering the coil layer 7, preventing the upper core layer 48 from being formed with high accuracy.

SUMMARY OF THE INVENTION

The present invention has been made with a view toward solving the problems, and it is an object of the present invention to provide a thin film magnetic head that permits a narrower track and reduced inductance by making a magnetic path shorter, and a manufacturing method for the same.

According to one aspect of the present invention, there is provided a thin film magnetic head comprising: a lower core layer; an upper core layer; and a recording portion that has magnetic pole layers and a gap layer positioned between the lower core layer and the upper core layer at a surface facing a recording medium, wherein a coil insulating layer is deposited on the lower core layer and at the rear of the recording portion in a height direction; a coil forming groove is formed in the coil insulating layer; and a coil layer for inducing a recording magnetic field to the lower core layer, the upper core layer, and the recording portion is embedded in the coil forming groove.

An object of the present invention is to realize a shorter magnetic path thereby to reduce inductance by forming a coil layer in a different position from a prior art so as to fabricate a thin film magnetic head capable of achieving a higher recording density and a higher recording frequency.

As described above, according to the present invention, the coil insulating layer is deposited on the lower core layer and at the rear in the height direction, the coil forming groove is formed in the coil insulating layer, and the coil layer is embedded in the coil forming groove.

More specifically, according to the present invention, the coil layer is formed at a position closer to the lower core layer as compared with the coil layer of the thin film magnetic head shown in FIG. 28. Hence, the present invention makes it possible to reduce the height from the top of the recording portion to the top of the insulating layer that covers the coil layer, as compared with the height in the thin film magnetic head shown in FIG. 28. Thus, the length of the upper core layer can be made smaller, allowing a more appropriate reduction in a magnetic path, with a consequent reduction in inductance.

According to the present invention, the coil forming groove is formed beforehand in the coil insulating layer deposited on the upper surface of the lower core layer, and the coil layer is embedded in the coil forming groove. This forming method is different from that for a coil insulating layer or a lower coil insulating layer disclosed in, for example, U.S application Ser. No. 09/632,450.

To be more specific, according to the method disclosed in U.S application Ser. No. 09/632,450, the coil layer is formed by the flame plating process, and the coil insulating layer is embedded in gaps between individual conductors of the coil layer. In this type of construction, the gaps are not completely filled with the coil insulating layer, leaving a danger of cavities being formed in the gaps.

Such cavities are apt to be produced because the coil insulating layer is isotropically formed by sputtering in extremely narrow coil gaps. If the cavities are formed, then a gas accumulating in the cavities expands due to heat generated when a magnetic head is driven, leading to a danger of causing a film in a thin film magnetic head to be deformed.

According to the present invention, the coil insulating layer is deposited on the entire surface of the lower core layer, the coil forming groove is formed in the coil insulating layer by, for example, a reactive ion etching process, and the coil layer is embedded in the coil forming groove.

Thus, in the invention, the coil insulating layer is not embedded in the extremely narrow gaps of the coil layer, eliminating the possibility of the problem in that cavities are produced in the coil insulating layer. Conversely, the coil layer is embedded in the coil forming groove according to the invention. Hence, although there is a danger of cavities being formed in the coil layer, the aforesaid problem can be solved by, for example, depositing the coil layer by electroplating or the like.

In a preferred form of the present invention, the upper surface of the coil insulating layer and the upper surface of the coil layer are flush with each other. In this case, it is preferable that the upper surface of the coil insulating layer and the upper surface of the coil layer have been etched using, for example, the CMP process.

In a preferred form of the present invention, when a junction surface between the recording portion and the upper core layer is defined as a reference plane, the upper surface of the coil insulating layer and the upper surface of the coil layer are flush with the reference plane.

Forming the coil layer such that its upper surface is flush with the reference plane makes it possible to maximize a thickness of the coil layer in a stepped portion between the lower core layer and the recording portion. Hence, decreasing the width of each conductor portion of the coil layer does not result in an increase in the coil resistance value that is inversely proportional to a sectional area. With this arrangement, the width of the entire coil layer ranging from the distal end portion to the proximal end portion of the upper core layer can be reduced, so that the magnetic path can be further shortened, permitting reduced inductance to be achieved.

In another preferred form of the invention, the coil insulating layer is an inorganic insulating layer formed of an inorganic material.

In yet another preferred form of the invention, an insulating under-layer is formed between the coil layer and the lower core layer. The insulating under-layer is deposited to provide appropriate magnetic insulation between the coil layer and the lower core layer. In the present invention, the insulating under-layer also serves as a stopper layer for preventing over-etching when the coil forming groove is formed in the coil insulating layer.

In a further preferred form of the invention, an insulating layer is deposited on the coil layer, and a second coil layer is deposited on the insulating layer. The second coil layer is electrically connected with the coil layer and induces a recording magnetic filed to the lower core layer, the upper core layer, and the recording portion. With this arrangement, the width of the coil layer can be further reduced and the magnetic path can be made even shorter with a consequent reduction in inductance.

In a further preferred form of the invention, the recording portion is constituted by a lower magnetic pole layer directly connected to the lower core layer, and a gap layer deposited on the lower magnetic pole layer, or constituted by an upper magnetic pole layer that is deposited on the lower core layer and directly connected with the upper core layer via a gap layer, or constituted by the lower magnetic pole layer directly connected with the lower core layer and an upper magnetic pole layer that is deposited on the lower magnetic pole layer via the gap layer and directly connected with the upper core layer. This arrangement makes it possible to fabricate a thin film magnetic head capable of achieving narrower gaps.

In another preferred form of the invention, the gap layer is composed of a nonmagnetic metal material that permits plating. Preferably, for the nonmagnetic metal material, one material or two or more different materials are selected from among NiP, NiPd, NiW, NiMo, Au, Pt, Rh, Pd, Ru, and Cr.

According to the invention, the recording portion may be constituted by a gap layer deposited on the lower core layer and an upper magnetic pole layer deposited on the gap layer, or the lower core layer may be provided with a protuberance jutting out toward an upper core layer integrally formed with the lower core layer, and the recording portion may be constituted by a gap layer deposited on the protuberance and the upper magnetic pole layer deposited on the gap layer.

In this case, the gap layer is preferably composed of an inorganic insulating material. As the inorganic insulating material, one material or two or more different materials are preferably selected from among $Al_2O_3$, $SiO_2$, SiON, AlN, and AlSiN.

According to another aspect of the present invention, there is provided a manufacturing method for a thin film magnetic head, comprising:

(a) a step for depositing a recording portion composed of a magnetic pole layer and a gap layer on a lower core layer;

(b) a step for depositing a coil insulating layer on a lower core layer at the rear of the recording portion in a height direction;

(c) a step for depositing a resist layer on the coil insulating layer and forming a coil pattern on the resist layer by exposure;

(d) a step for etching the coil insulating layer exposed through the coil pattern of the resist layer to an extent, where a surface of the lower core layer is not reached, so as to form a coil forming groove in the coil insulating layer;

(e) a step for removing the resist layer;

(f) a step for embedding a conductive material in the coil forming groove formed in the coil insulating layer in step (d), thereby to deposit a coil layer in the coil forming groove;

(g) a step for etching the coil layer and the coil insulating layer such that, when an upper surface of the recording portion is defined as a reference plane, an upper surface of the coil insulating layer and an upper surface of the coil layer are flush with the reference plane; and (h) a step for depositing an insulating layer on the coil layer and the coil insulating layer, then forming an upper core layer extending from the top of the insulating layer to the upper surface of the recording portion.

Thus, according to the present invention, after the recording portion is deposited on the lower core layer, the coil insulating layer is deposited over the entire surface of the lower core layer at the rear of the recording portion in the height direction.

Then, the resist layer having the coil pattern formed thereon is deposited on the coil insulating layer, the coil insulating layer exposed through the coil pattern formed in the resist layer is etched thereby to form a coil forming groove, which has substantially the same configuration as the coil pattern formed on the resist layer, in the coil insulating layer, then the coil layer is embedded in the coil forming groove.

According to the manufacturing method of the present invention, the coil layer can be formed in a step formed between the recording portion and the lower core layer. With this arrangement, the bulge of the insulating layer covering the coil layer that protrudes from the recording portion can be made smaller. As a result, a magnetic path can be made shorter and inductance can be reduced.

In the manufacturing method in accordance with the present invention, the coil insulating layer is first deposited on the lower core layer, then the coil forming groove is formed in the coil insulating layer. This arrangement prevents a problem in that a cavity is produced in the coil insulating layer, and also eliminates a danger in that a film in the thin film magnetic head is deformed due to heat generated when the magnetic head is driven.

Furthermore, according to the present invention, when the upper surface of the recording portion is defined as a reference plane, the coil layer and the coil insulating layer are etched in the step (g) so that the upper surface of the coil insulating layer and the upper surface of the coil layer are flush with the reference plane. Therefore, according to the present invention, the film thickness of the coil layer can be maximized in the stepped portion between the lower core layer and the recording portion. When the film thickness of the coil layer can be increased as mentioned above, reducing the width of each conductor portion of the coil layer does not cause the coil resistance value to increase. Hence, the width of the coil layer can be reduced to achieve an even shorter magnetic path.

In the present invention, the following step may be added between the step (b) and the step (c):

(i) a step for etching the coil insulating layer until its upper surface becomes flush with the upper surface of the recording portion.

In this step, the upper surface of the coil insulating layer can be formed into a flat surface since the surface of the coil insulating layer has been etched until the surface becomes flush with the upper surface of the recording portion after the coil insulating layer was deposited on the lower core layer. This provides an advantage in that the application of the resist layer and exposure of the resist layer in the subsequent step (c) can be performed with high accuracy.

In the present invention, the steps (a) and (b) may be replaced by the following steps:

(j) a step for depositing the coil insulating layer on the lower core layer;

(k) a step for forming a groove in the coil insulating layer in the height direction from a surface facing a recording medium; and (l) a step for forming the recording portion composed of a magnetic pole layer and a gap layer in the groove.

From the step (j) to the step (l), the coil insulating layer is first deposited on the lower core layer, then the groove is formed in the coil insulating layer. In the groove, the recording portion is formed. In other words, the coil insulating layer and the recording portion are formed in a reverse order from the steps (a) and (b).

In a preferred form of the present invention, in the step (a) or (l), the recording portion is formed by the lower magnetic pole layer and the gap layer, or the gap layer and the upper magnetic pole layer, or the lower magnetic pole layer, the gap layer, and the upper magnetic pole layer.

In this case, for the gap layer, it is preferable to select a nonmagnetic metal material that permits plating together with the magnetic pole layers. Preferably, for the nonmagnetic metal material, one material or two or more different materials are selected from among NiP, NiPd, NiW, NiMo, Au, Pt, Rh, Pd, Ru, and Cr.

Alternatively, according to the present invention, in the step (a), the recording portion may be formed by the gap layer and the upper magnetic pole layer, or both side surfaces of the recording portion and the surface of the lower core layer may be etched to form a protuberance, which projects toward the recording portion from the top of the lower core layer and continues from the recording portion, so that the protuberance is made integral with the lower core layer after the recording portion is formed.

In this case, the gap layer is preferably composed of an inorganic insulating material. As the inorganic insulating material, one material or two or more different materials are preferably selected from among $Al_2O_3$, $SiO_2$, SiON, AlN, and AlSiN.

In another preferred form of the present invention, to deposit the coil insulating layer on the lower core layer, an insulating under-layer is deposited on the lower core layer beforehand, and the coil forming groove is concavely formed in the coil insulating layer in the step (d) within a limit so that the surface of the insulating under-layer is not exposed.

The insulating under-layer serves as a "stopper layer" for preventing over-etching of the coil insulating layer in the step (d). Etching the coil insulating layer with the limit so that the surface of the insulating under-layer is not exposed ensures that at least the insulating under-layer lies between the lower core layer and the coil layer. This arrangement allows proper magnetic insulation to be provided between the lower core layer and the coil layer.

In the present invention, the coil insulating layer is preferably formed by an inorganic insulating material. This allows the surface of the coil insulating layer to be easily and properly etched in the step (g) or (i).

In a further preferred form of the present invention, in the step (h), after the insulating layer is deposited on the coil layer and the coil insulating layer, a second coil layer to be electrically connected to the coil layer is deposited on the insulating layer, then the upper core layer is formed on the second coil layer via the insulating layer. With this arrangement, the width of the coil layer can be further reduced, and inductance can be reduced by making the magnetic path shorter.

DESCRIPTION OF THE PREFERRED EMBODIMENTS

Figure 1:
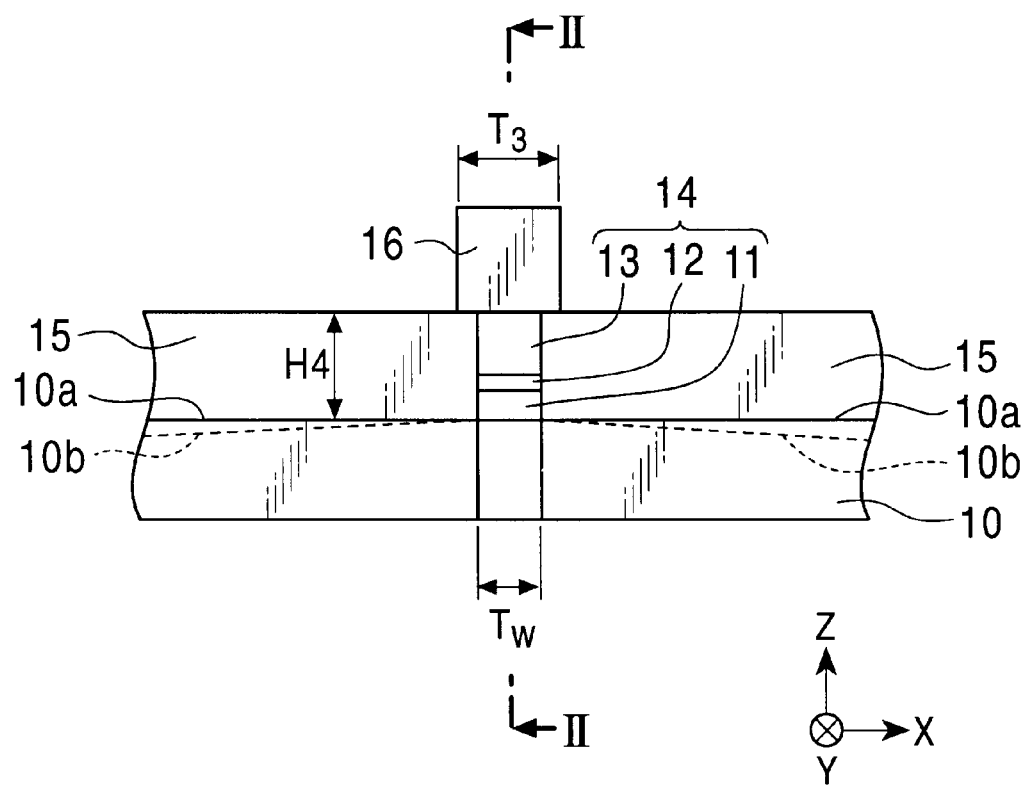
FIG. 1 is a partial front view showing a construction of a thin film magnetic head in accordance with the present invention.
Figure 2:
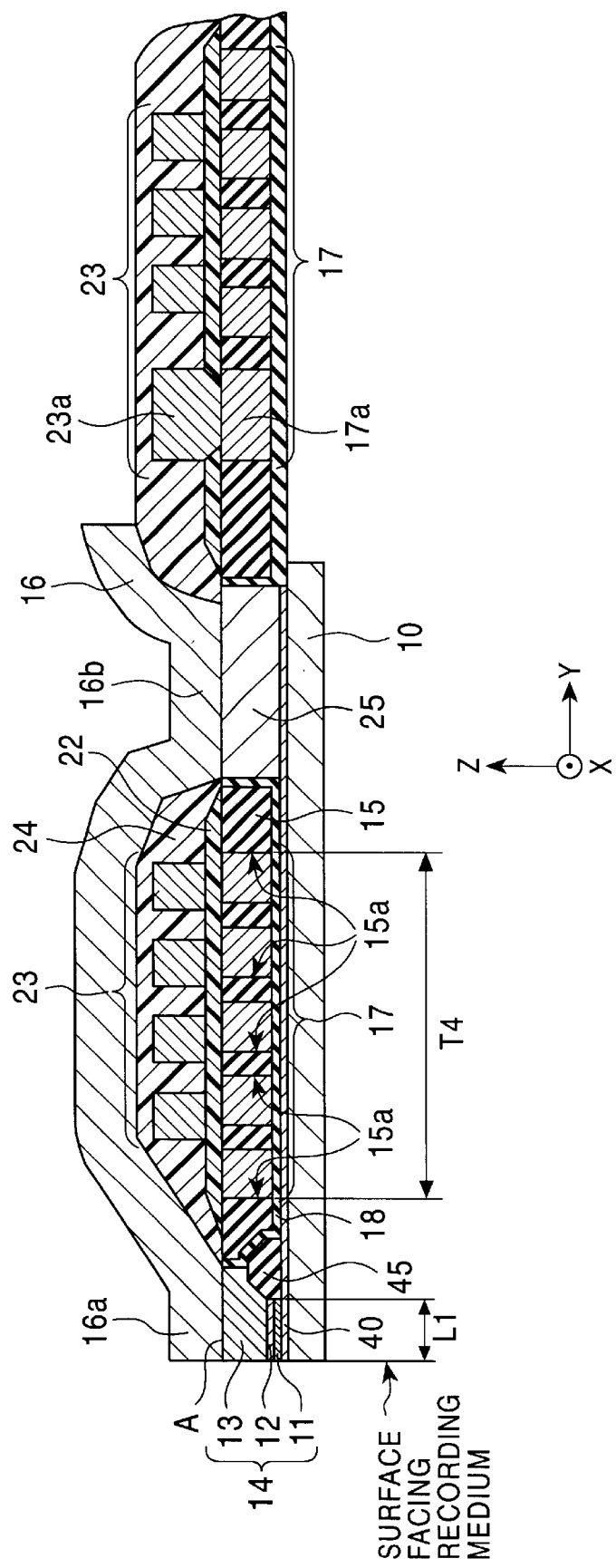
FIG. 2 is a partial sectional view of the thin film magnetic head cut along the line II—II shown in FIG. 1.

FIG. 1 is a partial front view showing a construction of a thin film magnetic head in accordance with an embodiment of the present invention, and FIG. 2 is a partial sectional view of the thin film magnetic head cut along the line II—II shown in FIG. 1, observed from the direction of an arrow.

The thin film magnetic head shown in FIG. 1 is a recording inductive head. In the present invention, a reproducing head utilizing magneto-resistance effect (MR head) may be provided under the inductive head.

Reference numeral 10 shown in FIGS. 1 and 2 denotes a lower core layer formed by a magnetic material, such as Permalloy. When a reproducing head is provided under the lower core layer 10, a shield layer for protecting a magneto-resistive element from noises may be provided separately from the lower core layer 10, or the lower core layer 10 may serve as an upper shield layer of the reproducing head without providing the shield layer.

Referring to FIG. 1, an upper surface 10a of the lower core layer 10 that extends from a proximal end of a lower magnetic pole layer 11, which will be discussed hereinafter, may be formed such that it extends in a direction parallel to a track width or in an X direction, or may be provided with slopes 10b and 10b that incline in a direction away from an upper core layer 16. Providing the upper surface of the lower core layer 10 with the slopes 10b and 10b makes it possible to properly prevent light fringing.

As shown in FIG. 1, a recording portion 14 is formed on the lower core layer 10. In this embodiment, the recording portion 14 is a "track width restricting portion" having a track width Tw. The track width Tw is preferably 0.7 $\mu$m or less, and more preferably 0.5 $\mu$m or less. With this track width, a thin film magnetic head permitting a narrower track can be fabricated. FIG. 1 does not show a plating under-layer 40 which is shown in FIG. 2 and which will be discussed later.

In the embodiment illustrated in FIGS. 1 and 2, the recording portion 14 is constituted by a laminated three-layer film composed of the lower magnetic pole layer 11, a gap layer 12, and an upper magnetic pole layer 13. The following will describe the magnetic pole layers 11 and 13, and the gap layer 12.

Referring to FIGS. 1 and 2, the lower magnetic pole layer 11, which will be the bottommost layer of the recording portion 14, is deposited by plating on the lower core layer 10. The lower magnetic pole layer 11 is magnetically connected to the lower core layer 10. The lower magnetic pole layer 11 may be formed by a material that is identical to or different from that of the lower core layer 10, and may be composed of either a single-layer film or a multi-layer film.

As shown in FIGS. 1 and 2, the nonmagnetic gap layer 12 is deposited on the lower magnetic pole layer 11.

According to the present invention, the gap layer 12 is preferably composed of a nonmagnetic metal material, and deposited by plating on the lower magnetic pole layer 11. In the present invention, as the nonmagnetic metal material, it is preferable to select one material or two or more different materials from among NiP, NiPd, NiW, NiMo, NiRh, Au, Pt, Rh, Pd, Ru, and Cr. The gap layer 12 may be formed of either a single-layer film or a multi-layer film.

An upper magnetic pole layer 13 to be magnetically connected to the upper core layer 16, which will be discussed hereinafter, is deposited by plating on the gap layer 12. The upper magnetic pole layer 13 may be formed by a material that is identical to or different from that of the upper core layer 16, and may be composed of either a single-layer film or a multi-layer film.

If the gap layer 12 is formed by a nonmagnetic metal material as described above, the lower magnetic pole layer 11, the gap layer 12, and the upper magnetic pole layer 13 can be sequentially deposited by plating.

In the present invention, the construction of the recording portion 14 is not limited to the laminated three-layer film as described above. For example, there is an embodiment according to the present invention, wherein the recording portion 14 is constituted by the lower magnetic pole layer 11 directly connected to the lower core layer 10 and the gap layer 12 deposited on the lower magnetic pole layer 11, or the upper magnetic pole layer 13 on the lower core layer 10, the upper magnetic pole layer 13 being directly connected to the upper core layer 16 via the gap layer 12.

As mentioned above, the lower magnetic pole layer 11 and the upper magnetic pole layer 13 making up the recording portion 14 may be composed of a material identical to or different from that of the core layer to which the respective magnetic pole layers are magnetically connected. However, in order to improve a recording density, the lower magnetic pole layer 11 and the upper magnetic pole layer 13 facing the gap layer 12 preferably have a higher saturation magnetic flux density than the saturation magnetic flux density of the core layer to which the respective magnetic pole layers are magnetically connected. Thus, the higher saturation magnetic flux density of the lower magnetic pole layer 11 and the upper magnetic pole layer 13 makes it possible to concentrate a recording magnetic field in the vicinity of a gap with a resultant higher recording density.

As shown in FIG. 1, the recording portion 14 has a thickness H4. For example, the film thickness of the lower magnetic pole layer 11 is approximately 0.4 $\mu$m, the film thickness of the gap layer 12 is approximately 0.2 $\mu$m, and the film thickness of the upper magnetic pole layer 13 is approximately 2 $\mu$m.

Referring to FIG. 2, the recording portion 14 extends from the surface facing a recording medium (ABS) in the height direction or the Y direction in the drawing, and has a length L1.

The length L1 is restricted as a gap depth Gd. The gap depth Gd significantly influences the electrical characteristics of the thin film magnetic head; therefore, the length L1 is set to a predetermined value in advance.

In the embodiment shown in FIG. 1, the gap depth Gd is determined by the position where a Gd-defining insulating layer 45 is deposited over the lower core layer 10. The gap depth Gd is adjusted by the length from the front end surface of the Gd-defining insulating layer 45 to the surface facing the recording medium (Air Bearing Surface: ABS).

In the present invention, as shown in FIG. 1, the coil insulating layer 15 on the lower core layer 10 is exposed to the surface facing the recording medium (ABS) at both sides of the recording portion 14. The coil insulating layer 15 is located at the rear of the recording portion 14 in the height direction (depth direction) or the Y direction in the drawing, and deposited on the entire upper surface of the lower core layer 10.

In the present invention, as shown in FIG. 2, the coil insulating layer 15 is provided with coil forming grooves 15a in an area where a coil layer 17 is to be formed. The coil layer 17 is embedded in the coil forming grooves 15a.

As shown in FIG. 2, preferably, an insulating under-layer 18 for securing insulation between the lower core layer and the coil layer is formed between the coil layer 17 and the lower core layer 10. The insulating under-layer 18 is preferably formed by an insulating material composed of at least one of, for example, AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The insulating under-layer 18 also functions as a "stopper layer" for preventing over-etching when forming the coil forming grooves 15a in the coil insulating layer 15 in a manufacturing process.

The coil layer 17 embedded in the coil forming grooves 15a provided in the coil insulating layer 15 is formed according to a spiral pattern around a spiral center 17a, and composed of a nonmagnetic conductive material, such as Cu, that has low electrical resistance.

In the present invention, as shown in FIG. 2, it is preferable that the upper surface of the coil insulating layer 15 is flush with the upper surface of the coil layer 17. This makes it possible to maximize the thickness of the coil layer 17 within the range of the film thickness of the coil insulating layer 15. Hence, decreasing the width of each conductor portion of the coil layer 17 does not result in an increase in the coil resistance value that is inversely proportional to a sectional area. Alternatively, the upper surface of the coil layer 17 may be lower than the upper surface of the coil insulating layer 15.

To make the upper surface of the coil insulating layer 15 and the upper surface of the coil layer 17 flush with each other, the CMP process, for example, may be used to etch the upper surface of the coil insulating layer 15 and the upper surface of the coil layer 17, as it will be described in conjunction with the manufacturing method, which will be discussed later. Thus, the upper surfaces of both the coil insulating layer 15 and the coil layer 17 will be etched.

Further, in the present invention, as shown in FIG. 2, when a junction surface between the recording portion 14 and the upper core layer 16 is defined as a reference plane A, it is preferable that the upper surface of the coil insulating layer 15 and the upper surface of the coil layer 17 are flush with the reference plane A. With this arrangement, the film thickness of the coil layer 17 can be maximized within a stepped portion formed between the recording portion 14 and the lower core layer 10, and the width of the coil layer 17 can be properly reduced without causing an increase in the coil resistance value that is inversely proportional to the sectional area.

In the present invention, however, the reference plane A, the upper surface of the coil insulating layer 15, and the upper surface of the coil layer 17 may not be formed to be flush, whereas they are flush in the example shown in FIG. 2. More specifically, the upper surface of the coil insulating layer 15 and the upper surface of the coil layer 17 may be formed to be higher or lower than the reference plane A.

The coil insulating layer 15 of the embodiment shown in FIGS. 1 and 2 is an inorganic insulating layer formed of an inorganic material. For the inorganic material, preferably, at least one is selected from among AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

It is not preferable to use an organic material for the coil insulating layer 15 because of the reason described below. As it will be described in detail hereinafter, when the upper surface of the coil insulating layer 15 and the upper surface of the coil layer 17 are etched using, for example, the CMP process, if the coil insulating layer 15 is composed of an organic material, then the stickiness peculiar to an organic material prevents proper etching of the upper surface of the coil insulating layer 15, making it difficult to form the upper surface of the coil insulating layer 15 and the upper surface of the coil layer 17 to be flush.

Referring to FIG. 2, an insulating layer 22 composed of an organic material, such as a resist or polyimide, is deposited on the coil layer 17 and the coil insulating layer 15. A second coil layer 23 is formed in a spiral pattern on the insulating layer 22. A spiral center 23a of the second coil layer 23 is electrically connected directly on the spiral center 17a of the coil layer 17 that is flush with the junction surface between the recording portion 14 and the upper core layer 16, namely, the reference plane A.

As shown in FIG. 2, the second coil layer 23 is covered by an insulating layer 24 composed of an organic material, such as a resist or polyimide. The upper core layer 16 composed of a magnetic material, such as Permalloy, is deposited on the insulating layer 24 by the flame plating process or the like.

As illustrated in FIG. 2, the upper core layer 16 has a distal end portion 16a thereof formed in contact with the recording portion 14, while a proximal end portion 16b thereof is in magnetic connection with a lifting layer or back gap layer 25 made of a magnetic material and formed on the lower core layer 10. The lifting layer 25 may be omitted; if the lifting layer 25 is omitted, then the proximal end portion 16b of the upper core layer 16 extends onto the lower core layer 10 to be in direct magnetic connection with the lower core layer 10. Furthermore, as shown in FIG. 1, a width T3 of the distal end portion 16a of the upper core layer 16 is made larger than the track width Tw.

Figure 3:
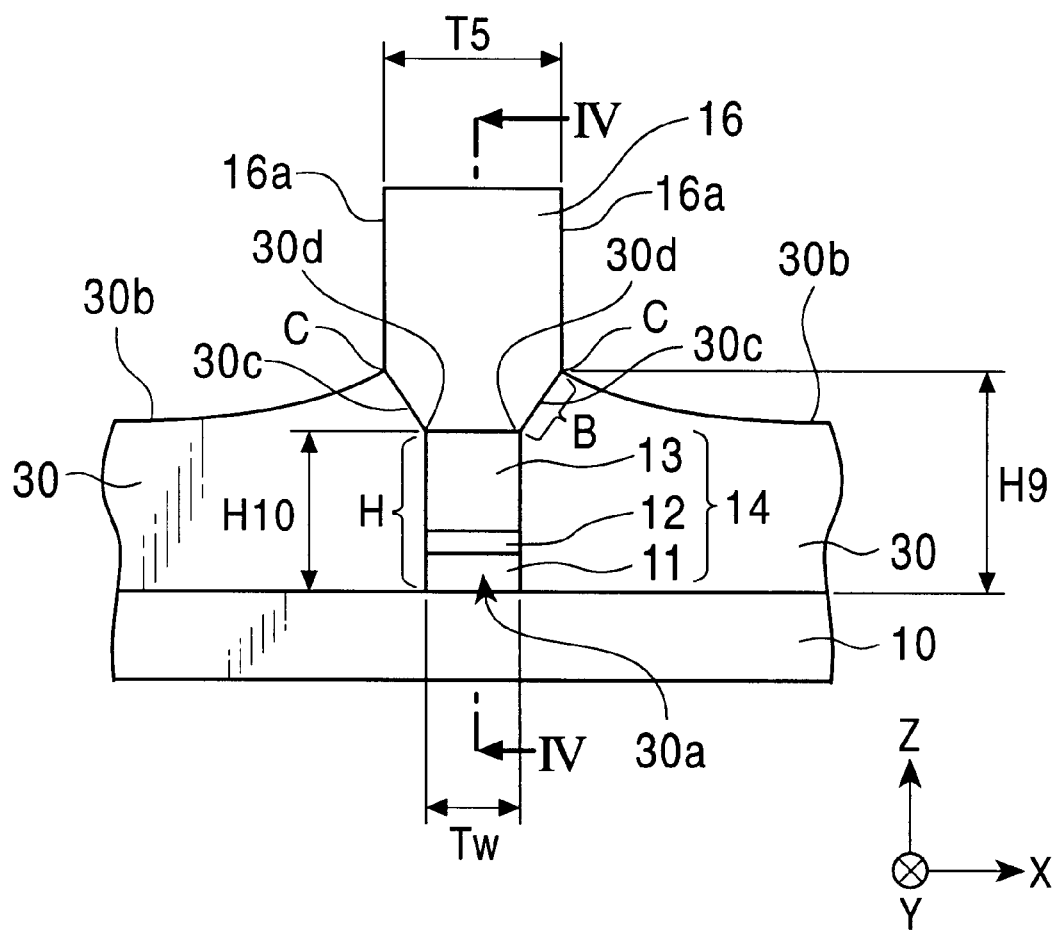
FIG. 3 is a partial front view showing a construction of another thin film magnetic head in accordance with the present invention.
Figure 4:
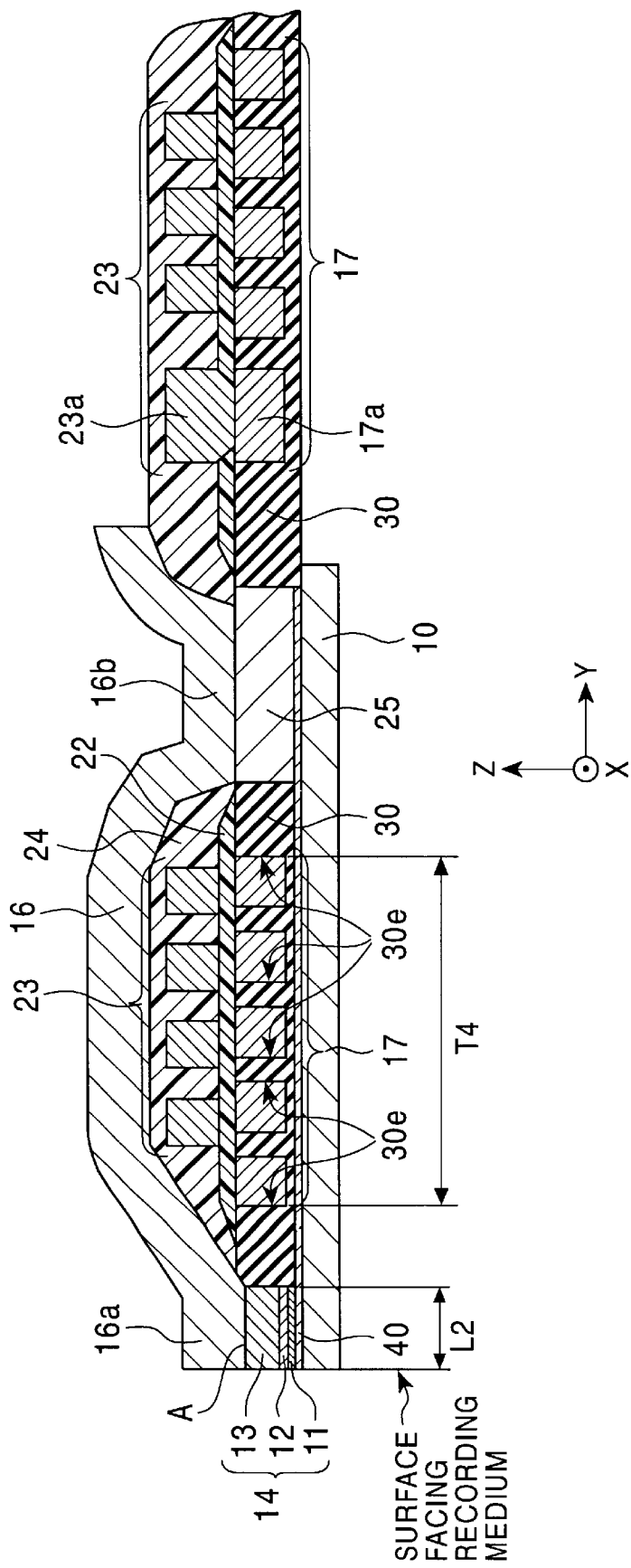
FIG. 4 is a partial sectional view of the thin film magnetic head cut along the line IV—IV shown in FIG. 3.

FIG. 3 is a partial front view showing a construction of a thin film magnetic head in accordance with another embodiment of the present invention, and FIG. 4 is a partial sectional view of the thin film magnetic head cut along the line IV—IV shown in FIG. 3, observed from the direction of the arrow. FIG. 3 does not show the plating under-layer 40 which is shown in FIG. 4 and which will be discussed later.

Reference numeral 10 shown in FIGS. 3 and 4 denotes a lower core layer formed of a soft magnetic material with high permeability, such as a Fe—Ni type alloy or Permalloy.

In the present invention, as shown in FIG. 3, a coil insulating layer 30 composed of an insulating material is deposited on the lower core layer 10. The insulating material is preferably an inorganic material composed of at least one of, for example, AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The coil insulating layer 30 is formed of a single layer or a multiple layers.

Referring to FIG. 3, a thickest portion of the coil insulating layer 30 has a thickness H9. To be specific, the thickness H9 preferably ranges from about 1.0 μm to about 4.0 μm.

According to the present invention, the coil insulating layer 30 has a groove 30a which extends from a surface 30b of the coil insulating layer 30 onto the lower core layer 10, and has a predetermined length L2 from the surface facing a recording medium (ABS) in the height direction or the Y direction in the drawing.

Furthermore, as shown in FIG. 3, the groove 30a has a track width region H formed to have the track width Tw from the upper surface of the lower core layer 10 to a predetermined height H10, and a slope region B in which slope surfaces 30c and 30c are formed such that the width of the groove 30a gradually increases, the slope region B extending from upper ends 30d and 30d of the track width region H to the surface 30b of the coil insulating layer 30. The groove 30a is formed by, for example, anisotropic etching.

In the present invention, the width of the track width region H of the groove 30a, i.e. the track width Tw, is formed to be 0.7 μm or less, and preferably 0.5 μm or less.

In the embodiment illustrated in FIG. 3, the recording portion 14 formed by a magnetic layer and a nonmagnetic gap layer is laminatedly formed in the track width region H.

The recording portion 14 is constituted by a lower magnetic pole layer 11 directly connected to the lower core layer 10 from below, a nonmagnetic gap layer 12, and an upper magnetic pole layer 13 directly connected to an upper core layer 16.

The gap layer 12 is preferably formed of a nonmagnetic metal material and formed by plating on the lower magnetic pole layer 11. According to the present invention, as the nonmagnetic metal material, it is preferable to select one material or two or more different materials from among NiP, NiPd, NiW, NiMo, NiRh, Au, Pt, Rh, Pd, Ru, and Cr. The gap layer 12 may be formed of either a single-layer film or a multi-layer film.

The material and film configuration of the lower magnetic pole layer 11 and the upper magnetic pole layer 13 are the same as those of the lower magnetic pole layer 11 and the upper magnetic pole layer 13 shown in FIG. 1.

In the present invention, the construction of the recording portion 14 is not limited to the laminate construction of the three-layer film as described above. For example, there is an embodiment according to the present invention wherein the recording portion 14 is constituted by the lower magnetic pole layer 11 directly connected to the lower core layer 10 and the gap layer 12 deposited on the lower magnetic pole layer 11, or the upper magnetic pole layer 13 on the lower core layer 10, the upper magnetic pole layer 13 being directly connected to the upper core layer 16 via the gap layer 12.

According to the present invention, as shown in FIG. 3, the upper core layer 16 extends from the tops of the slope surfaces 30c and 30c formed on the groove 30a to a boundary C between the slope surfaces 30c and 30c and the surface 30b of the coil insulating layer 30, and further extends away from the lower core layer 10 (upward in the drawing) from the boundary C.

Referring to FIG. 3, a bottom surface of the upper core layer 16 is magnetically connected to the upper magnetic pole layer 13. The upper core layer 16 is formed by a magnetic material, such as Permalloy, and may be formed of a material identical to or different from that of the upper magnetic pole layer 13.

As shown in FIG. 3, a width T5 of the upper core layer 16 in the track width direction or an X direction in the drawing is set to be larger than a width of the recording portion 14 formed in the track width region H, namely, the track width Tw. Setting the width T5 of the upper core layer 16 to a larger value allows magnetic saturation to be restrained.

In the embodiment shown in FIG. 3, the film thickness of the coil insulating layer 30 is H9 at a level in the vicinity of the boundary C between the slope 30c of the groove 30a and the surface 30b of the coil insulating layer 30. From the boundary C, the film thickness of the coil insulating layer 30 is gradually decreased away from the groove 30a. It can be understood that the surfaces 30b of the coil insulating layer 30 are formed to have a concave curve as shown in FIG. 1.

Thus, in FIG. 3, the surfaces 30b of the coil insulating layer 30 are shaped to have the concave curve so that the film thickness of the coil insulating layer 30 gradually decreases from the groove 30a away from the groove 30a. Alternatively, however, the coil insulating layer 30 may be formed to have virtually the same film thickness throughout, or the surfaces 30b of the insulating layer 30 may be formed to have tapered surfaces or slope surfaces rather than the curved surfaces.

Referring to FIG. 4, the coil insulating layer 30 overlies the lower core layer 10 and extends at the rear of the recording portion 14 in the height direction or the X direction in the drawing. The coil insulating layer 30 is provided with coil forming grooves 30e, and a coil layer 17 is embedded in the coil forming grooves 30e.

In this embodiment, the insulating under-layer 18 shown in FIG. 2 is not provided between a coil layer 17 and the lower core layer 10. Instead, the coil insulating layer 30 is formed. The presence of the coil insulating layer 30 provides magnetic insulation between the coil layer 17 and the lower core layer 10. The insulating under-layer 18 may, however, be provided between the coil layer 17 and the lower core layer 10 as shown in FIG. 2.

As shown in FIG. 4, the upper surface of the coil insulating layer 30 and the upper surface of the coil layer 17 are formed to be flush with each other so as to allow a maximum film thickness of the coil layer 17 within a range of the film thickness of the coil insulating layer 30. It is preferable that the upper surface of the coil insulating layer 30 and the upper surface of the coil layer 17 have been etched. This may be achieved by using, for example, the CMP process, as it will be described hereinafter in conjunction with a manufacturing method.

When a junction surface between the recording portion 14 and the upper core layer 16 is defined as a reference plane A, it is preferable that the upper surface of the coil insulating layer 30 and the upper surface of the coil layer. 17 are positioned to be flush with the reference plane A. This makes it possible to maximize the thickness of the coil layer 17 within a stepped portion between the recording portion 14 and the lower core layer 10. Hence, decreasing the width of the coil layer 17 does not result in an increase in the coil resistance value that is inversely proportional to a sectional area. In FIG. 4, however, it can be seen that the upper surface of the coil insulating layer 15 and the upper surface of the coil layer 17 are positioned higher than the reference plane A.

Referring to FIG. 4, an insulating layer 22 is deposited on the upper surfaces of the coil insulating layer 30 and the coil layer 17. A second coil layer 23 is formed in a spiral pattern on the insulating layer 22. As shown in FIG. 4, a spiral center 23a of the second coil layer 23 is directly formed on a spiral center 17a of the coil layer 17, which is a first layer, and the coil layer 17 and the second coil layer 23 are in electrical connection.

An insulating layer 24 is deposited on the second coil layer 23, and the upper core layer 16 is deposited by, for example, the flame plating process so that it extends from the top of the recording portion 14 to the top of the insulating layer 24. As shown in FIG. 4, a distal end portion 16a of the upper core layer 16 is directly connected onto the recording portion 14, while a proximal end portion 16b is directly connected onto a lifting layer (back gap layer) 25 which is deposited on the lower core layer 10 and which is made of a magnetic material, thereby forming a magnetic path extending from the lower core layer 10 to the upper core layer 16.

The embodiment shown in FIG. 2 is different from the embodiment shown in FIG. 4 in the manufacturing method, which will be described hereinafter.

In the embodiment shown in FIG. 2, the recording portion 14 is first deposited on the lower core layer 10, then the coil insulating layer 15 is deposited over the lower core layer 10 at the rear of the recording portion 14 in the height direction. In the embodiment shown in FIG. 4, the coil insulating layer 30 is first deposited on the lower core layer 10, then the groove 30a (see FIG. 3) is formed in the coil insulating layer 30. Thereafter, the recording portion 14 is formed in the groove 30a.

Figure 5:
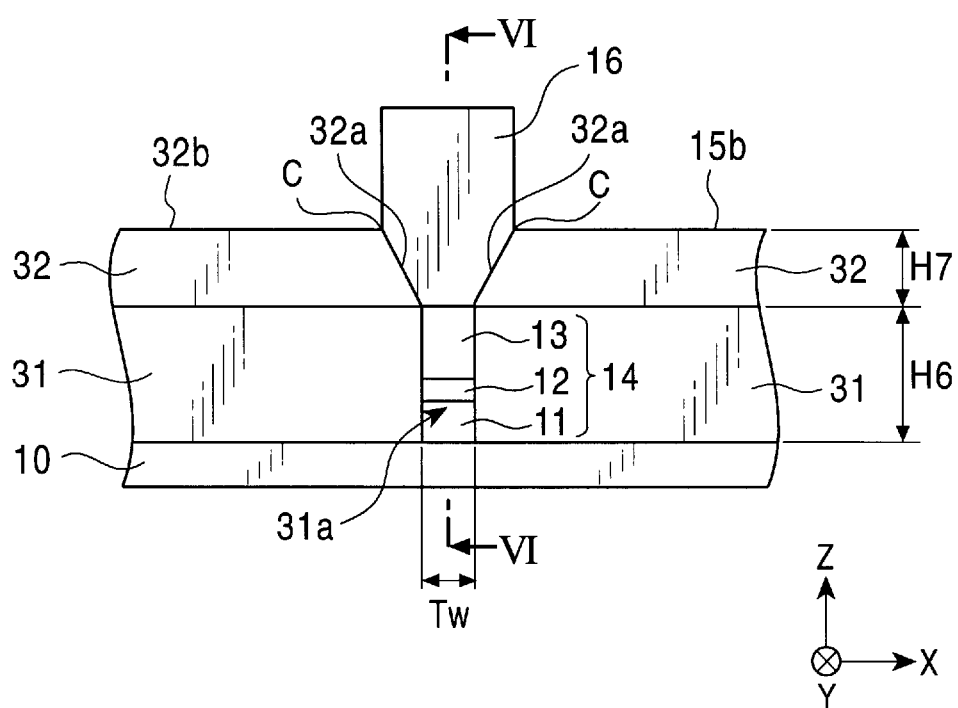
FIG. 5 is a partial front view showing a construction of still another thin film magnetic head in accordance with the present invention.
Figure 6:
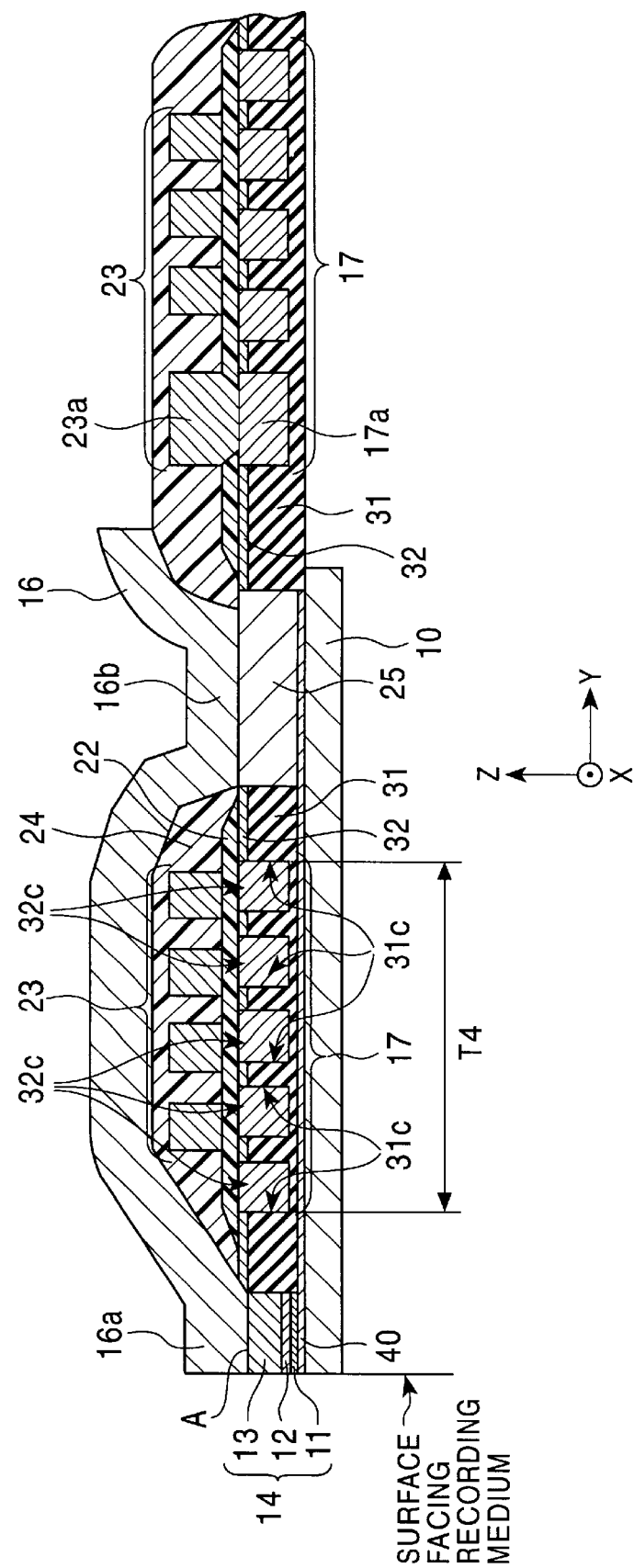
FIG. 6 is a partial sectional view of the thin film magnetic head cut along the line VI—VI shown in FIG. 5.

FIG. 5 is a partial front view showing a construction of a thin film magnetic head in accordance with still another embodiment of the present invention. FIG. 6 is a partial sectional view of the thin film magnetic head cut along the line VI—VI shown in FIG. 5. FIG. 5 does not show a plating under-layer 40 which is shown in FIG. 6 and which will be discussed hereinafter.

Reference numeral 10 shown in FIG. 5 denotes a lower core layer formed of a soft magnetic material with high permeability, such as a Fe—Ni type alloy or Permalloy.

According to the present invention, a main coil insulating layer 31 composed of an insulating material and an auxiliary coil insulating layer 32 deposited on the main coil insulating layer 31 are deposited on the lower core layer 10 as shown in FIG. 5.

Preferably, both the main coil insulating layer 31 and the auxiliary coil insulating layer 32 are formed by inorganic insulating layers composed of an inorganic material. In this embodiment, however, an etching rate of the main coil insulating layer 31 is proeferably larger than the etching rate of the auxiliary coil insulating layer 32. More preferably, there is a difference of ten times or more in the etching rate.

The main coil insulating layer 31 is formed of at least one of, for example, AlO, $SiO_2$, $Ta_2O_5$, TiO, AlN, AlSiN, TiN, SiN, NiO, WO, $WO_3$, BN, CrN, and SiON. The main coil insulating layer 31 is composed of a single layer or multiple layers.

If, for example, the main coil insulating layer 31 is formed using $SiO_2$, then the auxiliary coil insulating layer 31 is preferably formed using $Al_2O_3$ and/or $Si_3N_4$.

If the main coil insulating layer 31 is formed using $SiO_2$, the auxiliary coil insulating layer 32 is formed using $Al_2O_3$, and $C_3F_8$+(Ar) is employed as the gas for reactive ion etching process, then the etching rate of the main coil insulating layer 31 for the reactive ion etching process can be increased by approximately 15 times as compared with the etching rate of the auxiliary coil insulating layer 32.

If the main coil insulating layer 31 is formed using $SiO_2$, the auxiliary coil insulating layer 32 is formed using $Si_3N_4$, and $C_5F_8$+(Ar) is employed as the gas for the reactive ion etching process, then the etching rate of the main coil insulating layer 31 for the reactive ion etching process can be increased by approximately 15 times as compared with the etching rate of the auxiliary coil insulating layer 32.

Referring to FIG. 5, the main coil insulating layer 31 is provided with a groove 31a having a track width Tw. The groove 31a extends to the rear in a predetermined length from a surface facing a recording medium in the height direction or the Y direction in the drawing. The track width Tw is preferably 0.7 µm or less, and more preferably 0.5 µm or less.

As shown in FIG. 5, the main coil insulating layer 31 has a thickness H6, and the thickness H6 preferably ranges from about 1.0 µm to about 4.0 µm. Preferably, the auxiliary coil insulating layer 32 deposited on the main coil insulating layer 31 has a thickness H7. The thickness. H7 is preferably smaller than a thickness H6 of the main coil insulating layer 31. The auxiliary coil insulating layer 32 may be composed of a single-layer film or a multiple-layer film.

Referring to FIG. 5, a recording portion 14 composed of three layers, namely, a lower magnetic pole layer 11, a nonmagnetic gap layer 12, and an upper magnetic pole layer 13 in this order from bottom, is deposited in the groove 31a provided in the main coil insulating layer 31.

The gap layer 12 is preferably formed of a nonmagnetic metal material and deposited by plating on the lower magnetic pole layer 11. According to the present invention, as the nonmagnetic metal material, it is preferable to select one material or two or more different materials from among NiP, NiPd, NiW, NiMo, NiRh, Au, Pt, Rh, Pd, Ru, and Cr. The gap layer 12 may be formed of either a single-layer film or a multi-layer film.

The material and film configuration of the lower magnetic pole layer 11 and the upper magnetic pole layer 13 are the same as those of the lower magnetic pole layer 11 and the upper magnetic pole layer 13 shown in FIG. 1.

In the present invention, the construction of the recording portion 14 is not limited to the laminate construction of the three-layer film as described above. For example, there is an embodiment according to the present invention wherein the recording portion 14 is constituted by the lower magnetic pole layer 11 directly connected to the lower core layer 10 and the gap layer 12 deposited on the lower magnetic pole layer 11, or the upper magnetic pole layer 13 on the lower core layer 10, the upper magnetic pole layer 13 being directly connected to the upper core layer 16 via the gap layer 12.

Referring to FIG. 5, the auxiliary coil insulating layer 32 on the main coil insulating layer 31 is provided with slope surfaces 32a and 32a that gradually spread in the direction of the track width or in an X direction in the drawing, extending from the upper end of the groove 31a formed in the main coil insulating layer 31 to the auxiliary coil insulating layer 32.

Furthermore, an upper core layer 16 is formed by the flame plating process or the like, extending from the surface of the upper magnetic pole layer 13 deposited in the groove 31a over to the tops of the slope surfaces 32a. Preferably, the upper core layer 16 is deposited so that it extends to a boundary C between the slope surfaces 32a and a surface 32b of the auxiliary coil insulating layer 32. Forming the upper core layer 16 so that it extends to the boundary C allows the width of the upper core layer 16 to be increased, minimizing chances of occurrence of magnetic saturation at a higher recording density in the future.

Referring to FIG. 6, the main coil insulating layer 31 and the auxiliary coil insulating layer 32 overlie the lower core layer 10 at the rear of the recording portion 14 in a height direction or in a Y direction in the drawing.

Furthermore, as shown in FIG. 6, coil forming grooves 31c and 32c are continuously formed in the auxiliary coil insulating layer 32 and the main coil insulating layer 31. A coil layer 17 is embedded in the coil forming grooves 31c and 32c.

In this embodiment, the insulating under-layer 18 shown in FIG. 2 is not formed between the coil layer 17 and the lower core layer 10. Instead, the main coil insulating layer 31 is formed. The presence of the main coil insulating layer 31 provides magnetic insulation between the coil layer 17 and the lower core layer 10. The insulating under-layer 18 may, however, be provided between the coil layer 17 and the lower core layer 10 as shown in FIG. 2.

As shown in FIG. 6, the upper surface of the auxiliary coil insulating layer 32 and the upper surface of the coil layer 17 are formed to be flush with each other so as to allow a maximum film thickness of the coil layer 17 within a range of the film thickness of the main coil insulating layer 31 and the auxiliary coil insulating layer 32. It is preferable that the upper surface of the auxiliary coil insulating layer 32 and the upper surface of the coil layer 17 have been etched. This may be achieved by using, for example, the CMP process, as it will be described hereinafter in conjunction with a manufacturing method.

When a junction surface between the recording portion 14 and the upper core layer 16 is defined as a reference plane A, it is preferable that the upper surface of the auxiliary coil insulating layer 32 and the upper surface of the coil layer 17 are positioned to be flush with the reference plane A. This makes it possible to maximize the thickness of the coil layer 17 within a stepped portion between the recording portion 14 and the lower core layer 10. Hence, decreasing the width of the coil layer 17 does not result in an increase in the coil resistance value that is inversely proportional to a sectional area. In FIG. 6, however, it can be seen that the upper surface of the auxiliary coil insulating layer 32 and the upper surface of the coil layer 17 are positioned higher than the reference plane A.

Referring to FIG. 6, an insulating layer 22 is deposited on the upper surfaces of the auxiliary coil insulating layer 32 and the coil layer 17. A second coil layer 23 is deposited in a spiral pattern on the insulating layer 22. As shown in FIG. 6, a spiral center 23a of the second coil layer 23 is directly formed on a spiral center 17a of the coil layer 17, which is a first layer, and the coil layer 17 and the second coil layer 23 are in electrical connection.

An insulating layer 24 is deposited on the second coil layer 23, and the upper core layer 16 is formed by, for example, the flame plating process so that it extends from the top of the recording portion 14 to the top of the insulating layer 24. As shown in FIG. 6, a distal end portion 16a of the upper core layer 16 is directly connected onto the recording portion 14, while a proximal end portion 16b is directly connected onto a lifting layer (back gap layer) 25 which is deposited on the lower core layer 10 and which is made of a magnetic material, thereby forming a magnetic path extending from the lower core layer 10 to the upper core layer 16.

In this embodiment, as in the case of the embodiment shown in FIGS. 3 and 4, the main coil insulating layer 31 and the auxiliary coil insulating layer 32 are first laminatedly deposited on the lower core layer 10, then the slope surfaces 32a and 32a are formed on the auxiliary coil insulating layer 32. Thereafter, the groove 31a of the main coil insulating layer 31 is formed, and the recording portion 14 is formed in the groove 31a.

Figure 7:
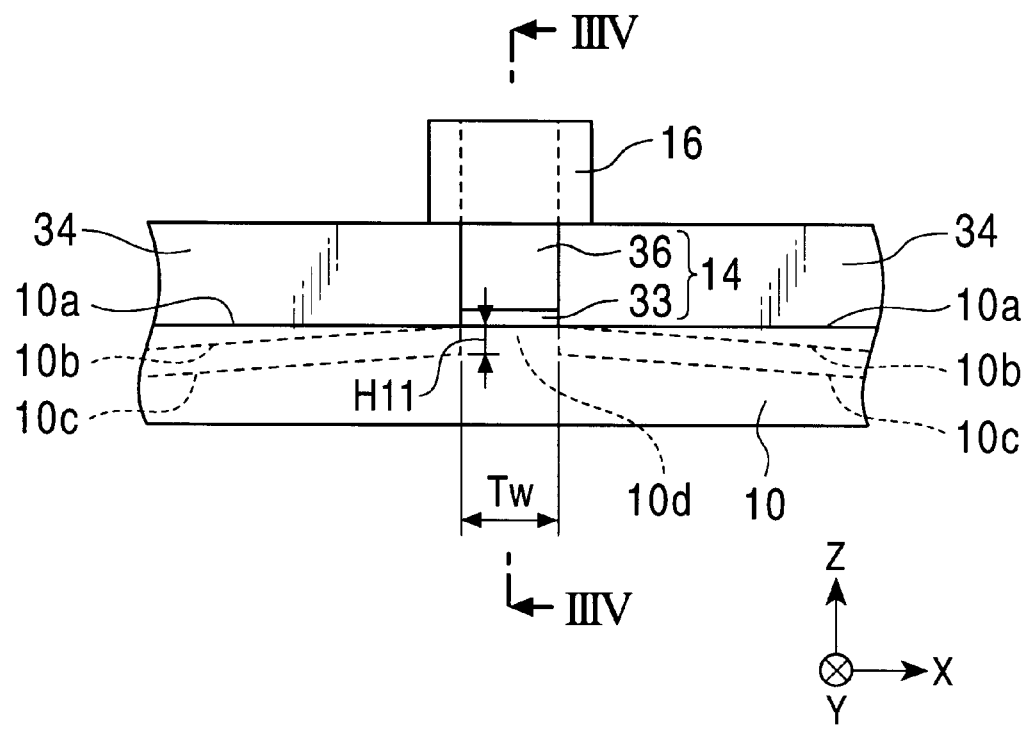
FIG. 7 is a partial front view showing a construction of yet another thin film magnetic head in accordance with the present invention.
Figure 8:
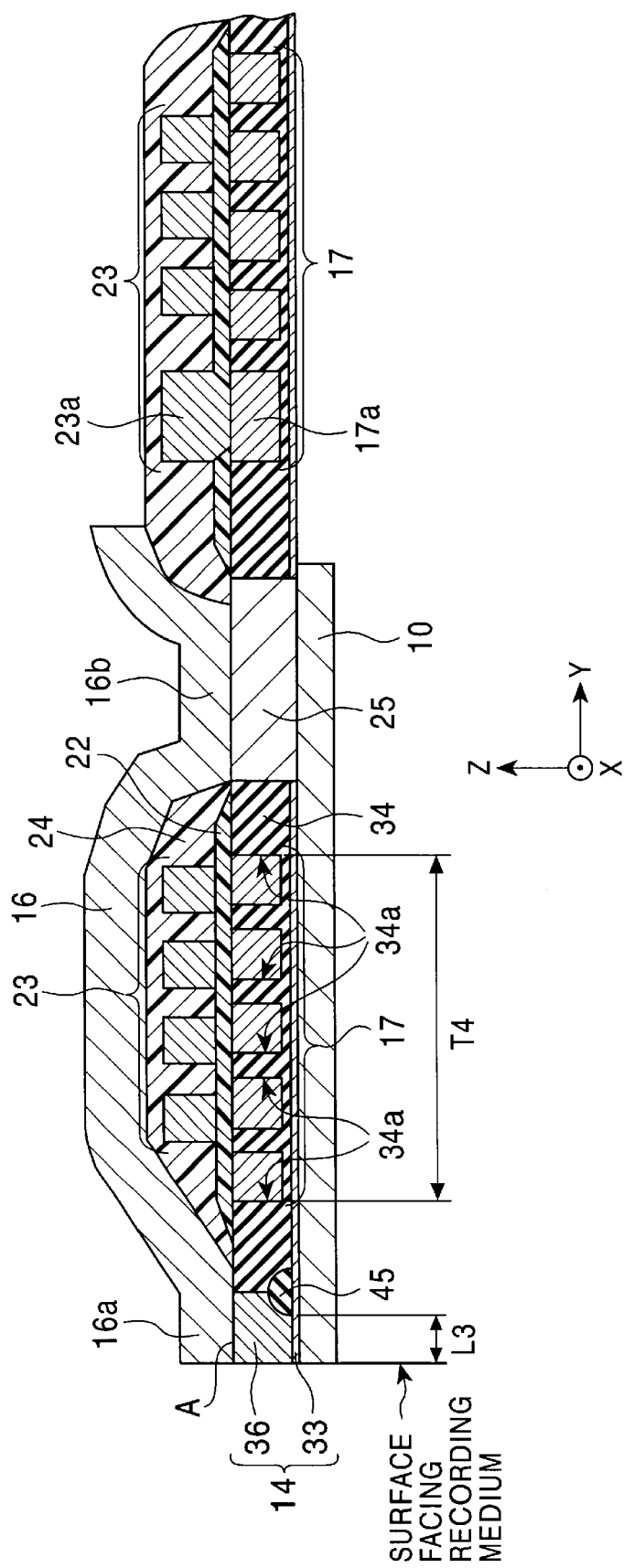
FIG. 8 is a partial sectional view of the thin film magnetic head cut along the line VIII—VIII shown in FIG. 7.

FIG. 7 is a partial front view showing a construction of a thin film magnetic head in accordance with still another embodiment of the present invention. FIG. 8 is a partial sectional view of the thin film magnetic head cut along the line VIII—VIII shown in FIG. 7.

Reference numeral 10 shown in FIG. 7 denotes a lower core layer formed of a soft magnetic material with high permeability, such as a Fe—Ni type alloy or Permalloy.

According to the present invention, a recording portion 14 constituted by a nonmagnetic gap layer 33 and an upper magnetic pole layer 36 directly connected to an upper core layer 16 is deposited on the lower core layer 10, as shown in FIG. 7. The recording portion 14 has a track width Tw.

The gap layer is preferably formed of an inorganic insulating material. In this case, for the inorganic insulating material, it is preferable to select one material or two or more different materials from among $Al_2O_3$, $SiO_2$, SiON, AlN, and AlSiN.

Referring to FIG. 7, an upper surface 10a of the lower core layer 10 that extends from a proximal end of the gap layer 33 may be formed such that it extends in a direction parallel to a track width or in an X direction in the drawing, or may be provided with slopes 10b and 10b that incline in a direction away from an upper core layer 16. Providing the upper surface of the lower core layer 10 with the slopes 10b and 10b makes it possible to further properly prevent light fringing.

As shown in FIG. 7, if the lower core layer 10 is etched to portions denoted by 10c, the lower core layer 10 is provided with a protuberance 10d jutting out toward the upper core layer 16, and the recording portion 14 is formed on the protuberance 10d, then the occurrence of light fringing can be further restrained.

The protuberance 10d has a track width Tw and a height H11. The height H11 ranges., for example, from 0.2 $\mu$m to 0.5 $\mu$m Coil insulating layers 34 are deposited on both sides of the recording portion 14 in a track width direction or an X direction in the drawing, as shown in FIG. 7. Furthermore, the upper core layer 16 having a larger width than the track width Tw is formed from above the recording portion 14 onto the coil insulating layer 34. Alternatively, the width of the upper core layer 16 may be the track width Tw, as indicated by dashed lines in the drawing.

Referring to FIG. 8, the coil insulating layer 34 is deposited on the lower core layer 10 at the rear of the recording portion 14 in a height direction or a Y direction in the drawing. Coil forming grooves 34a are formed in the coil insulating layer 34, and a coil layer 17 is embedded in the coil forming grooves 34a.

The embodiment shown in FIG. 8 does not have the insulating under-layer 18 between the lower core layer 10 and the coil layer 17 as shown in FIG. 2. Alternatively, however, the insulating under-layer 18 may be formed between the lower core layer 10 and the coil layer 17, as shown in FIG. 2.

In this embodiment, a gap layer 33 deposited on the lower core layer 10 lies between the lower core layer 10 and the coil layer 17. The gap layer 33 can be used as a stopper layer just like the insulating under-layer 18.

Referring to FIG. 8, a Gd-defining insulating layer 45 is deposited on the gap layer 33. The gap depth (Gd) is determined by a length L3 from a front end surface of the Gd-defining insulating layer 45 to a surface facing a recording medium.

The coil layer 17 embedded in the coil forming grooves 34a provided in the coil insulating layer 34 is formed according to a spiral pattern around a spiral center 17a, and composed of a nonmagnetic conductive material, such as Cu, that has low electrical resistance.

In the present invention, as shown in FIG. 8, it is preferable that the upper surface of the coil insulating layer 34 is flush with the upper surface of the coil layer 17. This makes it possible to maximize the thickness of the coil layer 17 within the range of the film thickness of the coil insulating layer 34. Hence, decreasing the width of each conductor portion of the coil layer 17 does not result in an increase in the coil resistance value that is inversely proportional to a sectional area.

To make the upper surface of the coil insulating layer 34 and the upper surface of the coil layer 17 flush with each other, the CMP process, for example, may be used to etch the upper surface of the coil insulating layer 34 and the upper surface of the coil layer 17. Thus, the upper surfaces of both the coil insulating layer 34 and the coil layer 17 will be etched.

Further, in the present invention, as shown in FIG. 8, when a junction surface between the recording portion 14 and the upper core layer 16 is defined as a reference plane A, it is preferable that the upper surface of the coil insulating layer 34 and the upper surface of the coil layer 17 are flush with the reference plane A. With this arrangement, the film thickness of the coil layer 17 can be maximized within a stepped portion formed between the recording portion 14 and the lower core layer 10, and the width of the coil layer 17 can be properly reduced without causing an increase in the coil resistance value that is inversely proportional to the sectional area.

The coil insulating layer 34 is an inorganic insulating layer formed of an inorganic material. For the inorganic material, preferably, at least one is selected from among AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Referring to FIG. 8, an insulating layer 22 composed of an organic material, such as a resist or polyimide, is deposited on the coil layer 17 and the coil insulating layer 34. A second coil layer 23 is deposited in a spiral pattern on the insulating layer 22. A spiral center 23a of the second coil layer 23 is magnetically connected directly on the spiral center 17a of the coil layer 17 that is flush with the junction surface between the recording portion 14 and the upper core layer 16, namely, the reference plane A.

As shown in FIG. 8, the second coil layer 23 is covered by an insulating layer 24 composed of an organic material, such as a resist or polyimide. The upper core layer 16 composed of a magnetic material, such as Permalloy, is deposited on the insulating layer 24 by flame plating process or the like.

As illustrated in FIG. 8, the upper core layer 16 has a distal end portion 16a thereof formed in contact with the recording portion 14, while a proximal end portion 16b thereof is in magnetic connection with a lifting layer or back gap layer 25 made of a magnetic material and deposited on the lower core layer 10. The lifting layer 25 may be omitted; if the lifting layer 25 is omitted, then the proximal end portion 16b of the upper core layer 16 extends onto the lower core layer 10 to be in direct magnetic connection with the lower core layer 10.

This embodiment is different from the thin film magnetic head shown in FIG. 1 through FIG. 6 in that the gap layer 33 constituting the recording portion 14 is deposited on the lower core layer 10 such that it extends farther at the rear in the height direction than an upper magnetic pole layer 36. To fabricate the recording portion 14 and the coil insulating layer 34 of a thin film magnetic head shown in FIG. 8, the gap layer 33 is first deposited on the lower core layer 10, then the upper magnetic pole layer 36 is deposited on the gap layer 33. Thereafter, the coil insulating layer 34 is deposited on the gap layer 33 at the rear of the upper magnetic pole layer 36 in the height direction.

In the inductive heads shown in FIG. 1 through FIG. 8 described in detail above, when a recording current is applied to the coil layer 17 and the second coil layer 23, a recording magnetic field is induced in the lower core layer 10 and the upper core layer 16. A magnetic signal is recorded in a recording medium, such as a hard disk, by a leakage field from between the upper core layer 16 and the magnetic pole layer directly connected to the lower core layer 10 or between the magnetic pole layer and the other core layer if the magnetic pole layer is deposited on only one core layer.

According to the present invention, all the thin film magnetic heads shown in FIG. 1 through FIG. 8 share the same construction in which the coil insulating layer is deposited on the lower core layer, the coil forming grooves are formed in the coil insulating layer, and the coil layer 17 is embedded in the coil forming grooves.

As shown in FIGS. 2, 4, 6, and 8, the recording portion 14 is formed on the lower core layer 10 and in the vicinity of the surface facing a recording medium, the coil insulating layer is deposited at the rear of the recording portion 14 in the height direction or in the Y direction in the drawings, and the coil layer is embedded in the coil forming grooves provided in the coil insulating layer. With this arrangement, the heights of the individual layers bulging from the upper surface of the recording portion 14 can be reduced. Hence, even if the coil layer employs a double-layer construction, the height of the insulating layer 24 covering the second coil layer 23 that bulges from the upper surface of the recording portion 14 can be controlled to a minimum.

Therefore, when depositing the upper core layer 16 that extends from the upper surface of the recording portion 14 to the upper surface of the insulating layer 24 by the flame plating process, the possibility of occurrence of irregular reflection or the like can be minimized during exposure, permitting the upper core layer 16 to be formed in a predetermined shape with high accuracy.

According to the present invention, there is no need to employ the double-layer structure for the coil layers; the coil layer may be formed of a single layer, that is, only the coil layer 17. In this case, the insulating layer 22 is deposited on the coil layer 17, and the upper core layer 16 is formed using the flame plating process or the like such that the upper core layer 16 extends from the upper surface of the recording portion 14 to the upper surface of the insulating layer 22.

When the coil layer 17 is deposited of a single layer, a deposited film that bulges from the upper surface of the recording portion 14 will have only the film thickness of the insulating layer 22. Hence, the upper core layer 16 can be formed in a predetermined configuration with higher accuracy from the upper surface of the recording portion 14 to the upper surface of the insulating layer 22.

According to the present invention, the coil insulating layer 15 is deposited on the entire surface of the lower core layer 10 beforehand, the coil forming grooves are formed in the coil insulating layer by using a resist, then the coil layer 17 is embedded in the coil forming grooves. This arrangement eliminates a danger of occurrence of defects, such as cavities, in the coil insulating layer of a fabricated thin film magnetic head.

More specifically, if, for example, the coil layer 17 is first deposited on the lower core layer 10 by the flame plating process or the like, then the gaps between the conductor portions of the coil layer 17 are filled with the coil insulating layer, then the coil insulating layer tends to incur cavities when the coil insulating layer is deposited by sputtering or the like. Such cavities lead to a danger in that, for example, heat generated when the magnetic head is driven causes an expansion of a gas accumulating in the cavities, resulting in deformation of the configuration of a film in the thin film magnetic head.

To avoid the above problem, in the present invention, the coil insulating layer is first deposited by the flame plating process, then the coil layer 17 is embedded in the coil forming grooves formed in the coil insulating layer. This arrangement eliminates the possibility of the defects, such as cavities, in the coil insulating layer. Hence, the heat generated when the magnetic head is driven should not lead to occurrence of problems, such as the deformation of the configuration of a film in the thin film magnetic head.

In the present invention, however, there is a danger of the coil layer 17 incurring defects, including the cavities, since the coil layer 17 is embedded in the coil forming grooves. This problem can be solved by depositing the coil layer 17 by the metal plating process or the like.

The coil layers in the thin film magnetic heads according to the embodiments shown in FIGS. 2, 4, 6, and 8 are composed of two laminated layers. The laminated double-layer coil structure is employed in order to reduce a width T4 of the coil layer 17 thereby to reduce a length from the distal end portion 16a to the proximal end portion 16b of the upper core layer 16. Thus, the magnetic path formed from the lower core layer 10 via the upper core layer 16 can be shortened so as to decrease the inductance. This arrangement makes it possible to manufacture a thin film magnetic head capable of handling still higher recording frequencies in the future. For example, it has been verified that, if the coil layer 17, which is the first layer, is formed with five turns, and the second coil layer 23 is formed with four turns, then the width T4 of the coil layer 17 can be reduced to approximately 20 $\mu$m.

Figure 28:
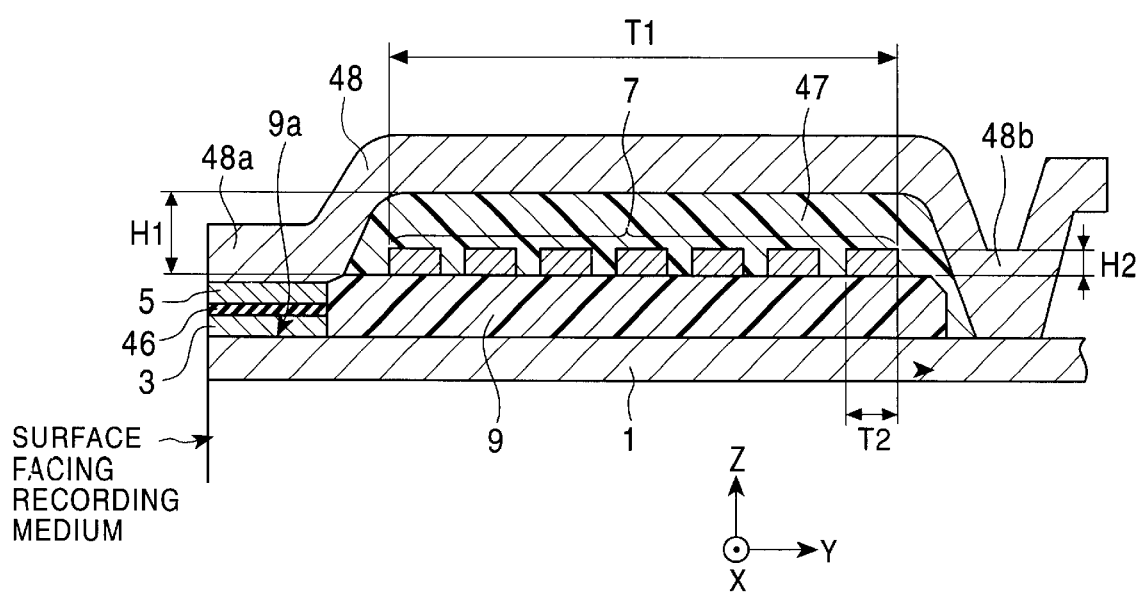
FIG. 28 is a partial sectional view of the thin film magnetic head cut along the line XXVIII—XXVIII shown in FIG. 27.

As described above, the coil layer 17, which is the first layer, is located at the rear of the recording portion 14 in the height direction, and when the junction surface between the recording portion 14 and the upper core layer 16 is defined as the reference plane A, the upper surface of the coil layer 17 is positioned to be flush with the reference plane A. With this arrangement, the height from the upper surface of the recording portion 14 to the upper surface of the bulging insulating layer 24 can be reduced, as compared with the case of the conventional thin film magnetic head (see FIG. 28) having the two laminated layers constituting the coil layers.

Thus, the present invention allows the width of the coil layer to be reduced, and also allows the height in a direction Z in the drawing from the top of the lower core layer 10 to be reduced. As a result, the length from the distal end portion 16a to the proximal end portion 16b of the upper core layer 16 can be properly reduced, the magnetic path can be made even shorter, and the inductance can be accordingly reduced, making it possible to fabricate a thin film magnetic head capable of achieving a higher recording frequency in the future.

The thin film magnetic heads in accordance with the present invention are also capable of achieving narrower tracks. As described above, the present invention allows the track width Tw of the recording portion 14 to be reduced to 0.7 $\mu$m or less, preferably 0.5 $\mu$m or less, which is a value smaller than a limit value of a resolution when a resist is subjected to exposure.

According to the present invention, when the junction surface between the recording portion 14 and the upper core layer 16 is defined as the reference plane A, the upper surface of the coil layer 17 and the upper surface of the coil insulating layer 15 are positioned to be flush with the reference plane A. Hence, the flat surface extends in the height direction from the reference plane A, so that the layers can be formed without waviness.

Thus, the insulating layer 22 can be planarized and deposited on the coil insulating layer 15 and the coil layer 17, and therefore, the second coil layer 23 can be deposited on the insulating layer 22 with high pattern accuracy.

FIG. 9 through FIG. 17 illustrate manufacturing steps of the thin film magnetic head shown in FIG. 2.

Figure 9:
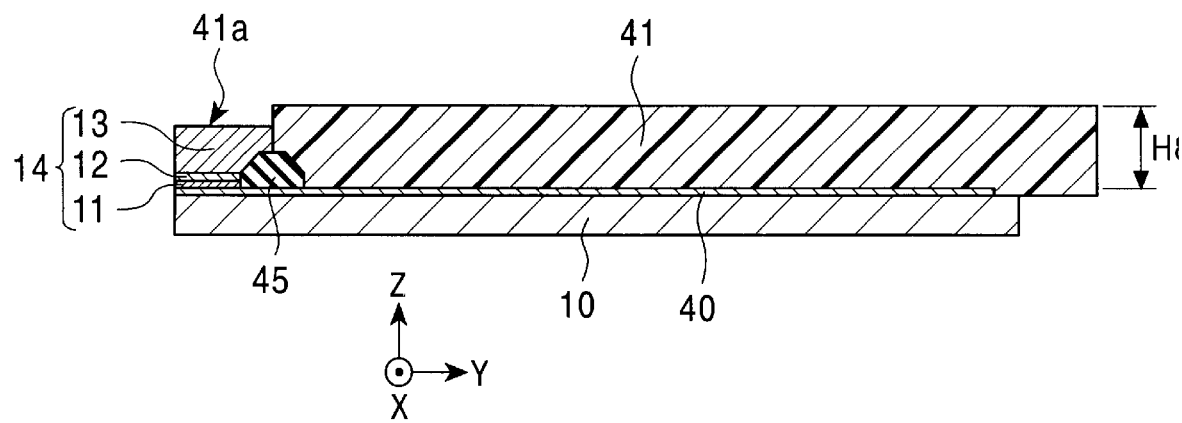
FIG. 9 is a diagram illustrating a step of a manufacturing method for the thin film magnetic head shown in FIG. 2.

Referring to FIG. 9, a plating under-layer 40 composed of a magnetic material, such as Permalloy, is first deposited on the lower core layer 10, the Gd-defining insulating layer 45 that determines a gap depth is deposited, then a resist layer 41 is applied onto the plating under-layer 40. A thickness H8 of the resist layer 41 must be larger than at least the thickness H4 of the recording portion 14 in the completed thin film magnetic head shown in FIG. 1.

Subsequently, the resist layer 41 is subjected to exposure to form a groove 41a that has a predetermined length in the height direction (the Y direction shown in the drawing) from the surface facing a recording medium, and also has a predetermined width in the track width direction (the X direction shown in the drawing). Then, the recording portion 14 is formed in the groove 41a.

Referring to FIG. 9, the recording portion 14 is constituted by the lower magnetic pole layer 11, the gap layer 12, and the upper magnetic pole layer 13 in this order from bottom, these layers being sequentially deposited by plating.

The film construction of the recording portion 14 formed in the groove 41a is not limited to the constructions of the foregoing three layers. More specifically, the recording portion 14 may be constructed by the lower magnetic pole layer 11 and the nonmagnetic gap layer 12, or by the nonmagnetic gap layer 12 and the upper magnetic pole layer 13. Each of the magnetic pole layers 11 and 13 and the gap layer 12 may be composed of either a single layer or multiple layers.

Preferably, the gap layer 12 is formed by plating together with the magnetic pole layers 11 and 13. For the nonmagnetic metal material that permits plating for depositing the gap layer 12, one material or two or more different materials are preferably selected from among NiP, NiPd, NiW, NiMo, Au, Pt, Rh, Pd, Ru, and Cr.

Figure 10:
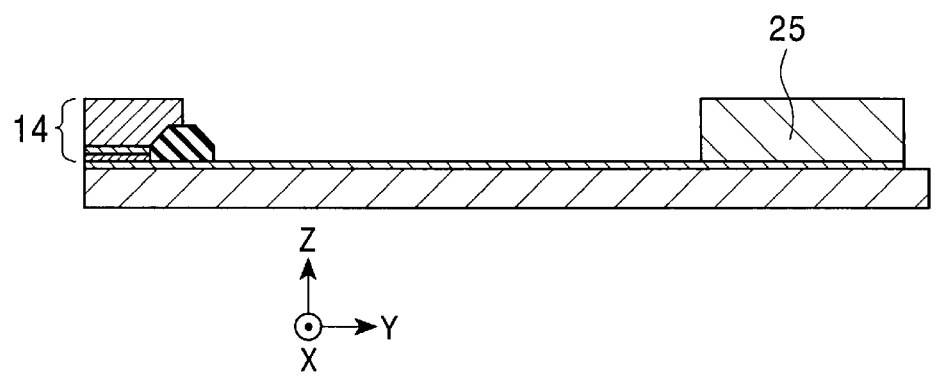
FIG. 10 is a diagram illustrating a step that follows the step shown in FIG. 9.

In a step shown in FIG. 10, a state is illustrated wherein the resist layer 41 has been removed. On the lower core layer 10, the recording portion 14 is formed in the vicinity of the ABS. In some cases, after the recording portion 14 is formed, the lifting layer 25 is formed at a position away from the recording portion 14 in the height direction.

It is possible to etch both side surfaces of the recording portion 14 shown in FIG. 10 (the side surfaces in the X direction in the drawing) from the track width direction (the X direction in the drawing) by ion milling thereby to reduce the width of the recording portion 14. The width of the recording portion 14 obtained by the ion milling is defined as the track width Tw.

The ion milling also etches the upper surface of the lower core layer 10 in the track width direction (the X direction in the drawing) that extends from the proximal end of the lower magnetic pole layer 11, thus forming the slopes 10b and 10b on the upper surface of the lower core layer 10 as shown in FIG. 1.

Figure 11:
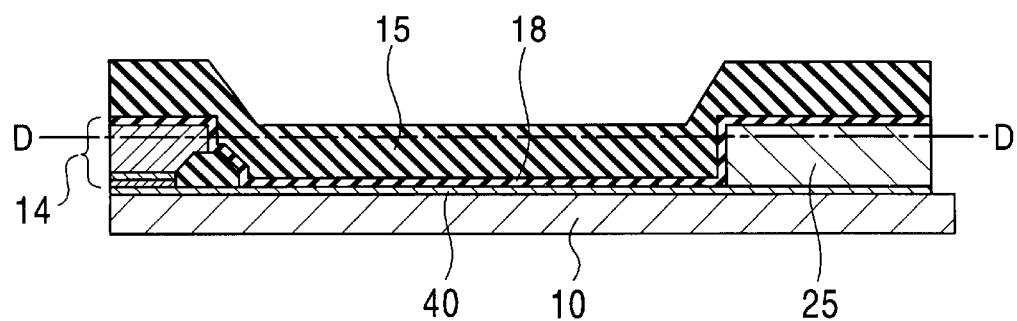
FIG. 11 is a diagram illustrating a step that follows the step shown in FIG. 10.

In a step illustrated in FIG. 11, the insulating under-layer 18 composed of an insulating material is deposited by sputtering such that the insulating under-layer 18 extends from the top of the recording portion 14 onto the magnetic under-layer 40, and further onto the top of the lifting layer 25 in the height direction.

Subsequently, as shown in FIG. 11, the coil insulating layer 15 overlies the lower core layer 10 via the magnetic under-layer 40 and the insulating under-layer 18. The coil insulating layer 15 may alternatively be deposited only on the lower core layer 10. In this embodiment, however, the coil insulating layer 15 is deposited over the recording portion 14 and the lifting layer 25.

Figure 12:
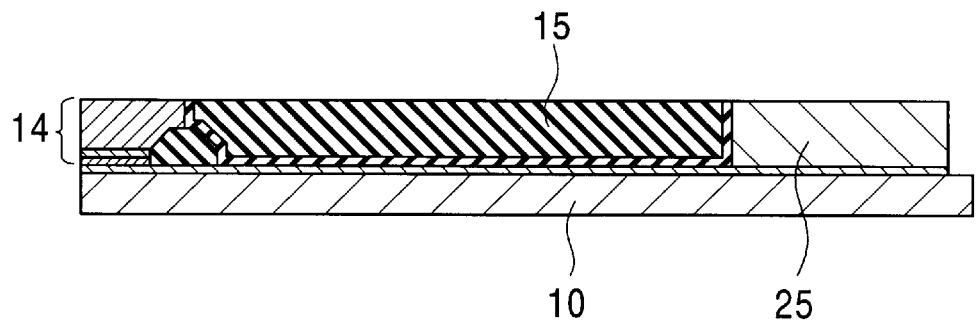
FIG. 12 is a diagram illustrating a step that follows the step shown in FIG. 11.

In the next step, the coil insulating layer 15 is etched by employing, for example, the CMP process to the line D—D shown in FIG. 11 to expose the surface of the recording portion 14 so as to make the upper surface of the coil insulating layer 15 flush with the upper surface of the recording portion 14 as shown in FIG. 12.

Figure 13:
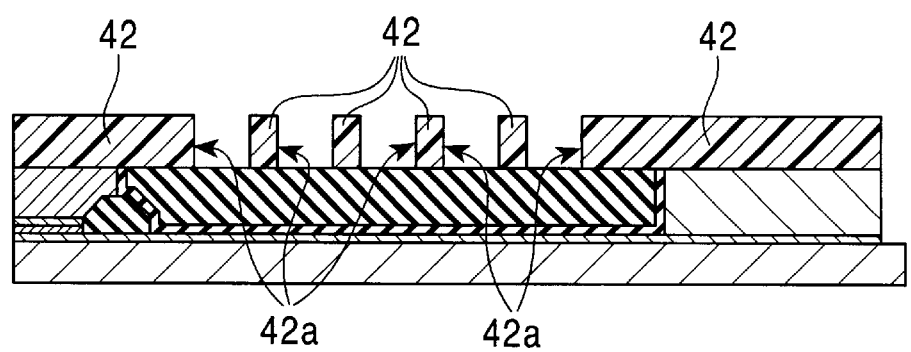
FIG. 13 is a diagram illustrating a step that follows the step shown in FIG. 12.

In a step illustrated in FIG. 13, a resist layer 42 is applied to the surface of the coil insulating layer 15 that has been planarized by the CMP process, then a coil pattern 42a is formed in the resist layer 42 by exposure.

Figure 14:
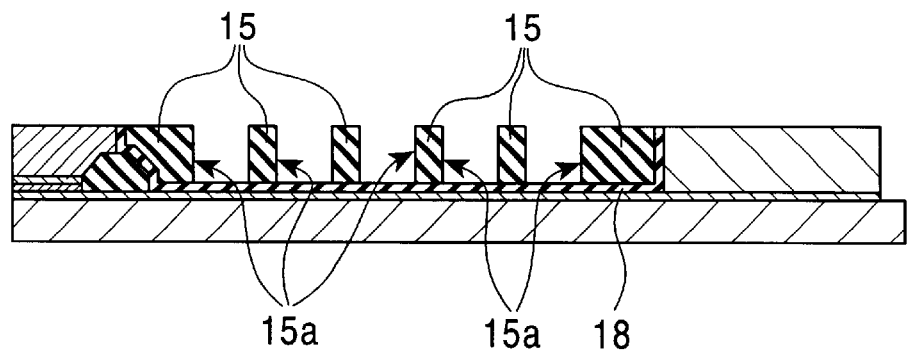
FIG. 14 is a diagram illustrating a step that follows the step shown in FIG. 13.

The surface of the coil insulating layer 15 exposed through the coil pattern 42a formed in the resist layer 42 is etched by the reactive ion etching process or the like thereby to form coil forming grooves 15a in the coil insulating layer 15, the coil forming grooves 15a having substantially the same configuration as that of the coil pattern 42a formed in the resist layer 42. Thereafter, the resist layer 42 is removed, which is illustrated in FIG. 14.

In the steps described above, it is necessary to properly adjust an etching time and so forth in order to concavely etch the coil forming grooves 15a in the coil insulating layer 15 exposed through the coil pattern 42a of the resist layer 42. The etching time should be set so that the etching is stopped as soon as the surface of the insulating under-layer 18 is exposed.

The insulating under-layer 18 is provided to secure magnetic insulation between the lower core layer 10 and a coil layer 17, which will be discussed hereinafter. In the present invention, the insulating under-layer 18 also functions as a stopper layer for preventing over-etching when the coil insulating layer 15 is etched.

If the insulating under-layer 18 is not provided, then it is required properly adjust the etching time, etc. to etch the coil insulating layer 15 with a limit so that the lower core layer 10 is not exposed. If the coil insulating layer 15 should be over-etched until the lower core layer 10 is exposed, then the magnetic insulation cannot be provided between the lower core layer 10 and the coil layer 17. This would lead to a necessity of providing an additional insulating layer on the lower core layer 10, complicating the manufacturing process.

Figure 15:
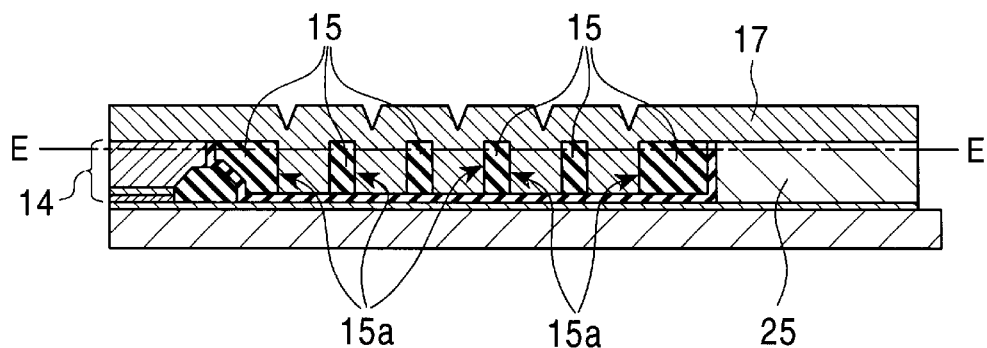
FIG. 15 is a diagram illustrating a step that follows the step shown in FIG. 14.

In a step illustrated in FIG. 15, a conductive material, such as Cu, is embedded in the coil forming grooves 15a formed in the coil insulating layer 15 thereby to form the coil layer 17 in the coil forming grooves 15a. In the embodiment shown in FIG. 15, the coil layer 17 is deposited on the recording portion 14, the coil insulating layer 15, and further on the lifting layer 25. In other words, the coil layer 17 produces a state wherein all conductor portions embedded in the coil forming grooves 15a are connected on the coil insulating layer 15.

To embed the coil layer 17 in the coil forming grooves 15a provided in the coil insulating layer 15, an existing method, such as the electroplating process, the sputtering process, or the CVD process, may be used.

In the electroplating process among the available processes mentioned above, plating under-layers are first deposited on the recording portion 14, the coil insulating layer 15, the lifting layer 25, and in the coil forming grooves 15a provided in the coil insulating layer 15, then, plating layers are grown on the plating under-layer. Thus, the coil layer 17 as shown in FIG. 15 can be formed.

As previously mentioned, the coil layer 17 could be formed using the sputtering process; however, using the sputtering process may cause a cavity in the coil layer 17 to be embedded in the coil forming grooves 15a. Preferably, therefore, the electroplating process or the CVD process is used.

Next, as illustrated in FIG. 15, the coil layer 17 projecting from the top of the coil insulating layer 15 is removed. The coil layer 17 is etched to the line E—E by using, for example, the CMP process in order to accommodate the conductor portions of the coil layer 17 only within the coil forming grooves 15a. Thus, the coil layer 17 is accommodated only in the coil forming grooves 15a formed in the coil insulating layer 15. In this step, when the upper surface of the recording portion 14 is defined as a reference plane, the upper surface of the coil insulating layer 15 and the upper surface of the coil layer 17 become flush with the reference plane. As shown in FIG. 15, when the coil layer 17 is etched to the line E—E, the surface of the coil insulating layer 15 is also etched. This state is illustrated in FIG. 16.

Figure 16:
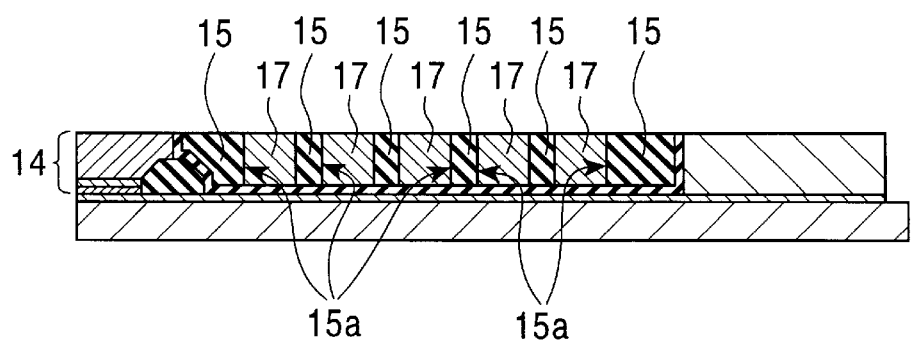
FIG. 16 is a diagram illustrating a step that follows the step shown in FIG. 15.

As set forth above, in FIG. 16, the coil layer 17 is in the coil forming grooves 15a provided in the coil insulating layer 15, and when the upper surface of the recording portion 14 is defined as the reference plane, the upper surface of the coil insulating layer 15 and the upper surface of the coil layer 17 are flush with the reference plane.

Figure 17:
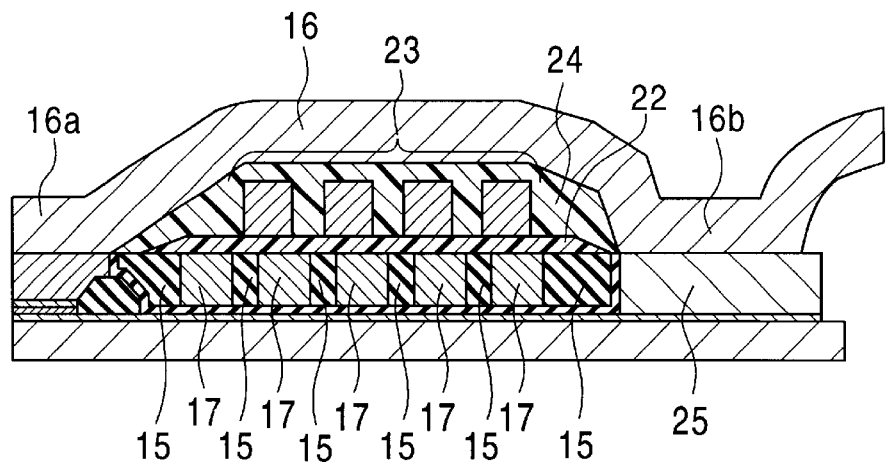
FIG. 17 is a diagram illustrating a step that follows the step shown in FIG. 16.

Then, as illustrated in FIG. 17, the insulating layer 22 is deposited on the coil insulating layer 15 and the coil layer 17. If the second coil layer 23 is deposited, the second coil layer 23 is pattern-deposited on the insulating layer 22 by the flame plating process, then the second coil layer 23 is covered by the insulating layer 24. Thereafter, the upper core layer 16 is deposited, beginning from the top of the recording portion 14 onto the insulating layer 24. To deposit the upper core layer 16, the distal end portion 16a of the upper core layer 16 is directly connected to the top of the recording portion 14, and the proximal end portion 16b is directly connected onto the lifting layer 25, as illustrated in FIG. 17.

Figure 18:
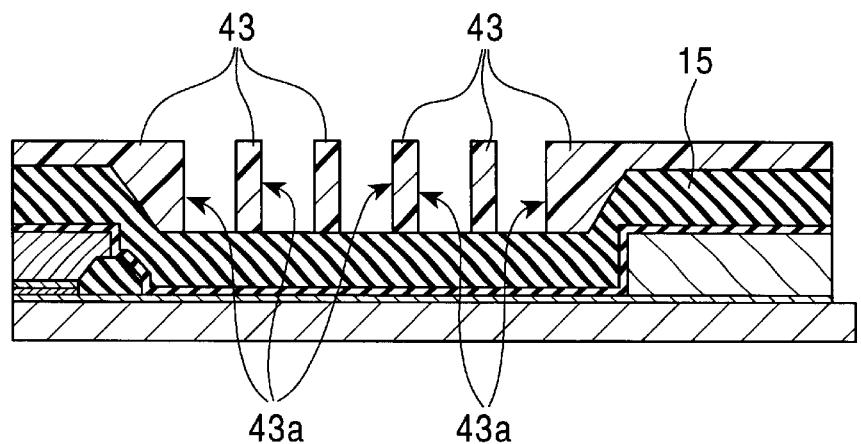
FIG. 18 is a diagram illustrating a step of another manufacturing method for the thin film magnetic head shown in FIG. 2.
Figure 19:
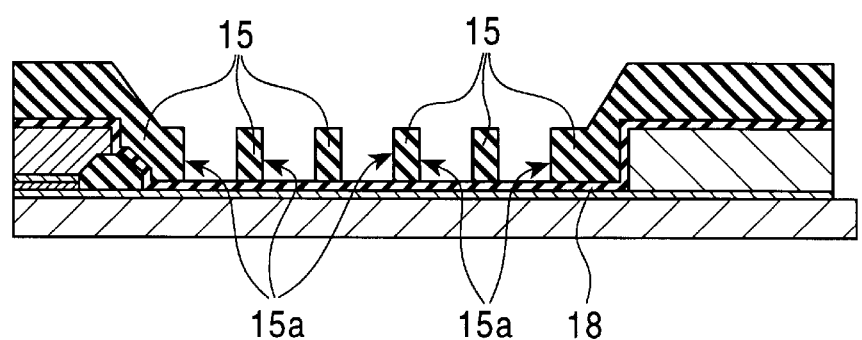
FIG. 19 is a diagram illustrating a step that follows the step shown in FIG. 18
Figure 20:
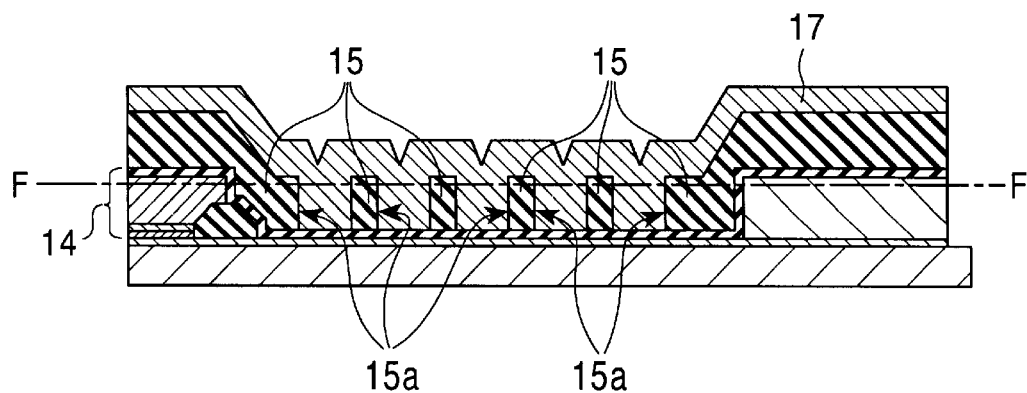
FIG. 20 is a diagram illustrating a step that follows the step shown in FIG. 19.

FIG. 18 through FIG. 20 show steps of another manufacturing method for the thin film magnetic head shown in FIG. 2. The steps shown in FIG. 18 through 20 are the modifications of the steps shown in FIG. 9 through FIG. 17; therefore, some steps shown in FIG. 9 through FIG. 17 will be referred to in the following descriptions.

First, as shown in FIGS. 9 and 10, the recording portion 14 is formed on the lower core layer 10 by making use of the resist layer 41, and the lifting layer 25 is further deposited. Then, as shown in FIG. 11, the coil insulating layer 15 is deposited so that the layer 15 extends from the top of the recording portion 14 to the top of the lower core layer 10, and further onto the lifting layer 25 by the sputtering process or the like.

Subsequently, as illustrated in FIG. 18, a resist layer 43 is applied onto the coil insulating layer 15, and a coil pattern 43a is formed in the resist layer 43 by exposure.

Then, the coil insulating layer 15 exposed through the coil pattern 43a formed in the resist layer 43 is etched by the reactive ion etching process or the like thereby to form coil forming grooves 15a in the coil insulating layer 15, the coil forming grooves 15a having the same configuration as that of the coil pattern 43a formed in the resist layer 43. A state wherein the resist layer 43 has been removed is illustrated in FIG. 19.

It is necessary to properly adjust an etching time and so forth in order to form the coil forming grooves 15a in the coil insulating layer 15. The etching time should be set so that etching is stopped as soon as the surface of the insulating under-layer 18 is exposed.

The insulating under-layer 18 is provided to secure magnetic insulation between the lower core layer 10 and the coil layer 17. In the present invention, the insulating under-layer 18 also functions as a stopper layer for preventing over-etching when the coil insulating layer 15 is etched.

If the insulating under-layer 18 is not provided, then it is required to properly adjust the etching time, etc. to etch the coil insulating layer 15 with a limit so that the lower core layer 10 is not exposed.

In a step illustrated in FIG. 20, a conductive material is embedded in the coil forming grooves 15a formed in the coil insulating layer 15 thereby to form the coil layer 17. In the embodiment shown in FIG. 20, the coil layer 17 is deposited on the recording portion 14, the coil insulating layer 15, and further on the lifting layer 25.

The coil layer 17 is deposited by the electroplating process, the sputtering process, the CVD process, etc. If the sputtering process among the above methods is employed to deposit the coil layer 17, defects, such as cavities, are apt to be produced in the coil layer 17 when embedding the coil layer 17 in the coil forming grooves 15a provided in the coil insulating layer 15. Therefore, it is preferred to use the electroplating or CVD process.

Next, as illustrated in FIG. 20, the coil layer 17 is etched to the line F—F by using, for example, the CMP process. By etching the coil layer 17 to the line F—F, the conductor portions of the coil layer 17 are accommodated only within the coil forming grooves 15a. When the upper surface of the recording portion 14 is defined as a reference plane, the upper surface of the coil insulating layer 15 and the upper surface of the coil layer 17 become flush with the reference plane. When the coil layer 17 is etched to the line F—F, the surface of the coil insulating layer 15 is also etched. The state wherein the coil layer 17 has been etched to the line F—F is the same as that illustrated in FIG. 16. Thereafter, as in the case of the step shown in FIG. 17, the insulating layer 22, the second coil layer 23, the insulating layer 24, and the upper core layer 16 are formed in this order.

Implementing the steps illustrated in FIG. 18 through FIG. 20 to fabricate the thin film magnetic head shown in FIG. 2 will involve only one etching process for a predetermined layer by using the CMP process (FIG. 20). This permits a simplified manufacturing process to be achieved.

When the steps illustrated in FIG. 9 through FIG. 17 are carried out to fabricate the thin film magnetic head shown in FIG. 2, it is necessary to implement the steps for etching predetermined layers by using the CMP process shown in FIGS. 11 and 15. On the other hand, the surface of the coil insulating layer 15 is planarized in the step of FIG. 12, so that the resist layer 42 can be easily formed on the coil insulating layer 15 with high accuracy.

FIG. 21 through FIG. 27 illustrate steps of the manufacturing process for the thin film magnetic head shown in FIG. 4.

Figure 21:
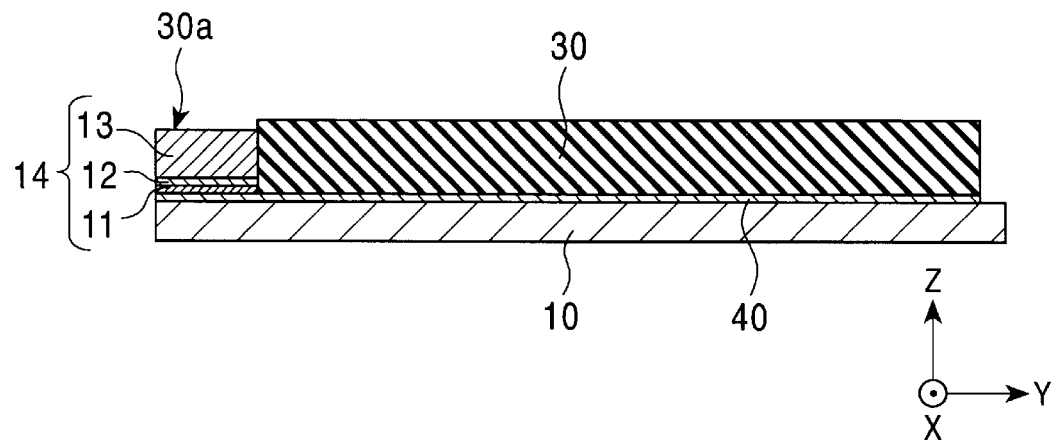
FIG. 21 is a diagram illustrating a step of the manufacturing method for the thin film magnetic head shown in FIG. 4.

First, as shown in FIG. 21, the plating under-layer 40 is deposited on the lower core layer 10, then the coil insulating layer 30 is deposited on the plating under-layer 40.

As illustrated in FIG. 21, a groove 30a that extends in the height direction or the Y direction in the drawing for a predetermined length from the surface facing a recording medium is formed in the coil insulating layer 30. The groove 30a is constituted by a track width region H having an inner width defined by the track width Tw, and a slope region B wherein slope surfaces 30c and 30c are formed such that a width of the slope region B gradually increases from both side ends 30d and 30d of the track width region H up to the surfaces 30b of the coil insulating layer 30 (refer to FIG. 3).

Subsequently, as shown in FIG. 21, the recording portion 14 is formed in the groove 30a formed in the coil insulating layer 30.

Referring to FIG. 21, the recording portion 14 is composed of the lower magnetic pole layer 11, the gap layer 12, and the upper magnetic pole layer 13 in this order from bottom. These layers are sequentially deposited by plating.

The film construction of the recording portion 14 formed in the groove 30a is not limited to the foregoing construction that includes the three layers. More specifically, the recording portion 14 may be constituted by the lower magnetic pole layer 11 and the nonmagnetic gap layer 12, or by the nonmagnetic gap layer 12 and the upper magnetic pole layer 13. Furthermore, each of the magnetic pole layers 11 and 13, and the gap layer 12 may be composed of a single layer or multiple layers.

Preferably, the gap layer 12 is deposited by plating together with the magnetic pole layers 11 and 13. For the nonmagnetic metal material that permits plating for forming the gap layer 12, one material or two or more different materials are preferably selected from among NiP, NiPd, NiW, NiMo, Au, Pt, Rh, Pd, Ru, and Cr.

Subsequently, a hole is formed in the coil insulating layer 30 at the rear in the height direction or the Y direction in the drawing from the recording portion 14, and the lifting layer 25 is formed in the hole by plating. Thereafter, as illustrated in FIG. 22, a resist layer 44 is applied onto the top of the recording portion 14, the coil insulating layer 30, and the lifting layer 25, then a coil pattern 44a is formed on the resist layer 44.

Figure 22:
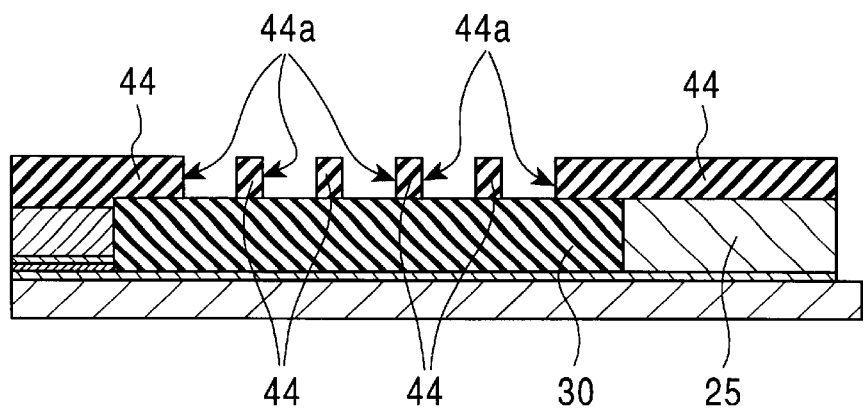
FIG. 22 is a diagram illustrating a step that follows the step shown in FIG. 21.

Referring to FIG. 22, the surface of the coil insulating layer 30 is exposed through the coil pattern 44a formed in the resist layer 44. Then, the coil insulating layer 30 exposed through the coil pattern 44a is etched by reactive ion etching process or the like.

Thus, coil forming grooves 30e are concavely formed in the coil insulating layer 30, the coil forming grooves 30e having substantially the same configuration as that of the coil pattern 44a formed in the resist layer 44. Thereafter, the resist layer 44 is removed, which is illustrated in FIG. 23.

Figure 23:
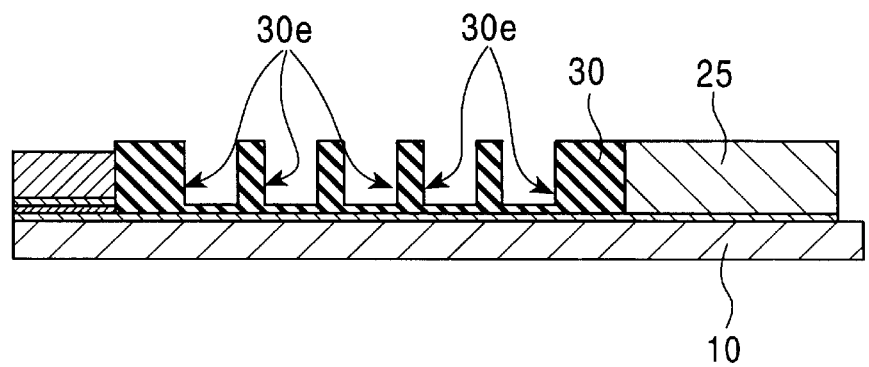
FIG. 23 is a diagram illustrating a step that follows the step shown in FIG. 22.

As shown in FIG. 23, the coil forming grooves 30e are formed in the coil insulating layer 30, and the coil insulating layer 30 is left at least on the bottom surfaces where the coil forming grooves 30e have been formed. If the coil insulating layer 30 is over-etched, causing the lower core layer 10 to be exposed at the bottom surfaces of the coil forming grooves 30e, then magnetic insulation cannot be provided between the coil layer 17 to be embedded in the coil forming grooves 30e later and the lower core layer 10. For this reason, in the present invention, it is necessary to etch the coil insulating layer 30 with a limit so that the lower core layer 10 is not exposed and that the coil insulating layer 30 remains beneath the coil forming grooves 30e.

As in the step shown in FIG. 11, the insulating under-layer 18 may be deposited on the plating under-layer 40 that has been deposited on the lower core layer 10 in advance, and the insulating under-layer 18 may be used as a stopper layer for preventing over-etching when the coil insulating layer 30 is etched.

Figure 24:
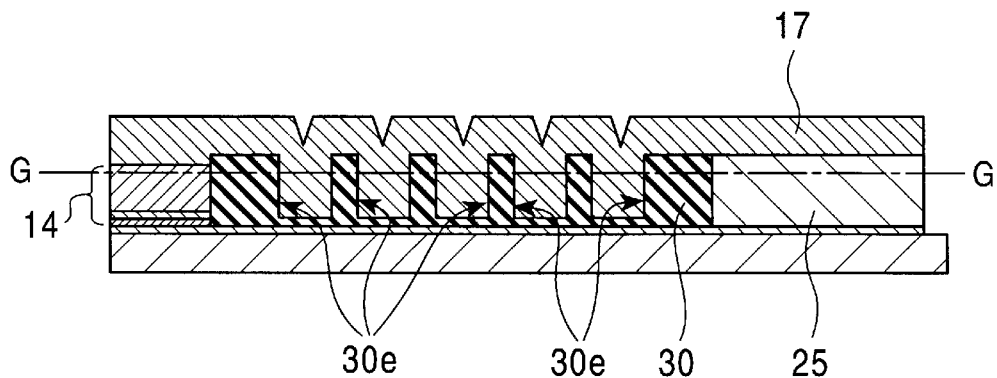
FIG. 24 is a diagram illustrating a step that follows the step shown in FIG. 23.

In the following step, as shown in FIG. 24, a conductive material is embedded in the coil forming grooves 30e formed in the coil insulating layer 30 thereby to form the coil layer 17. In the embodiment shown in FIG. 24, the coil layer 17 is deposited on the recording portion 14, the coil insulating layer 30, and further on the lifting layer 25. Hence, the coil layer 17 produces a state wherein all conductor portions embedded in the coil forming grooves 30e are connected on the coil insulating layer 15.

The coil layer 17 can be formed by an existing method, such as the electroplating process, the sputtering process, or the CVD process. However, employing the sputtering may cause a cavity to be formed in the coil layer 17 when embedding the coil layer 17 in the coil forming grooves 30e provided in the coil insulating layer 30. Preferably, therefore, the electroplating process or the CVD process is used to deposit the coil layer 17.

Next, as illustrated in FIG. 24, the coil layer 17 is etched to the line G—G by using, for example, the CMP process in order to accommodate the coil layer 17 only within the coil forming grooves 30e When the upper surface of the recording portion 14 is defined as a reference plane, the upper surface of the coil insulating layer 30 and the upper surface of the coil layer 17 can be made flush with the reference plane by etching the coil layer 17 to the line G—G.

As shown in FIG. 24, when the coil layer 17 is etched to the line G—G, the surface of the coil insulating layer 30 is also etched. This state wherein the coil layer 17 has been etched to the line G—G is illustrated in FIG. 25.

Figure 25:
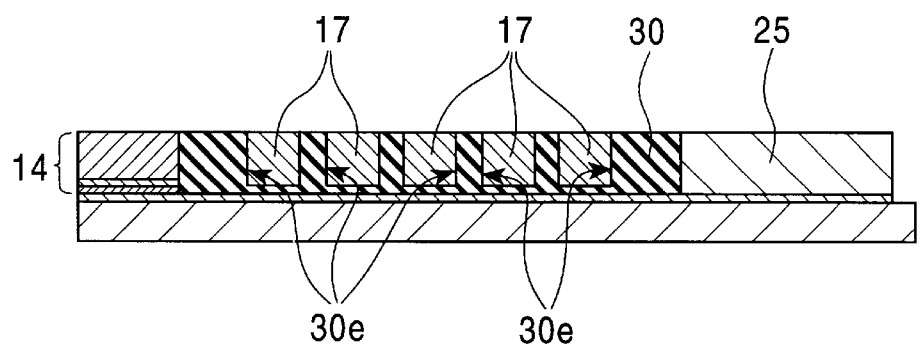
FIG. 25 is a diagram illustrating a step that follows the step shown in FIG. 24.

Referring to FIG. 25, the coil insulating layer 30 is deposited at the rear of the recording portion 14 in the height direction, and the coil forming grooves 30e are provided in the coil insulating layer 30. The coil layer 17 is embedded in the coil forming grooves 30e. As shown in FIG. 25, when the upper surface of the recording portion 14 is defined as the reference plane, the upper surface of the coil insulating layer 30 and the upper surface of the coil layer 17 are flush with the reference plane.

Figure 26:
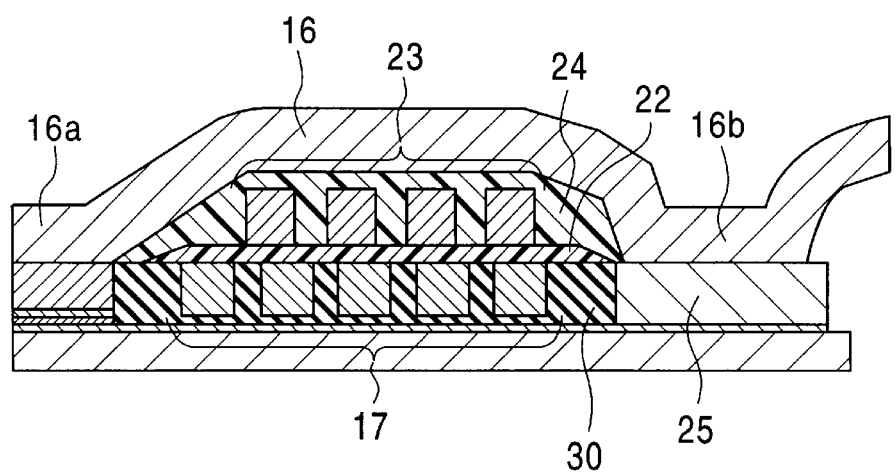
FIG. 26 is a diagram illustrating a step that follows the step shown in FIG. 25.
Figure 27:
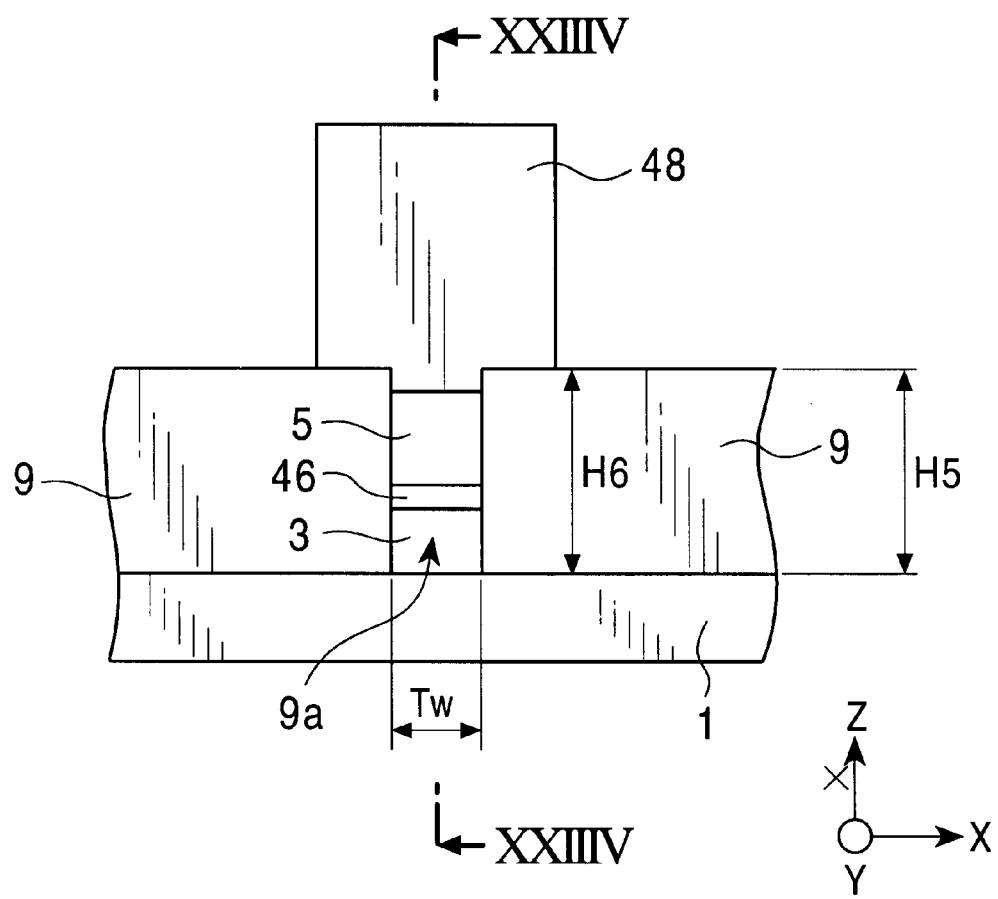
FIG. 27 is a partial front view showing a construction of a conventional thin film magnetic head.

Lastly, as illustrated in FIG. 26, the insulating layer 22 is deposited on the coil insulating layer 30 and the coil layer 17, then the second coil layer 23 is deposited on the insulating layer 22. Furthermore, the insulating layer 24 is deposited on the second coil layer 23, then the upper core layer 16 is deposited from the top of the recording portion 14 onto the insulating layer 24 by the flame plating process or the like.

As shown in FIG. 26, the distal end portion 16a of the upper core layer 16 is directly connected to the top of the recording portion 14, and the proximal end portion 16b is directly connected onto the lifting layer 25.

To fabricate the thin film magnetic head shown in FIG. 6, the main coil insulating layer 31 and the auxiliary coil insulating layer 32 are deposited on the lower core layer 10, then a groove is formed in the vicinity of the surfaces, which face a recording medium, of the auxiliary coil insulating layer 32 and the main coil insulating layer 31, and the recording portion 14 is formed in the groove.

In the embodiment shown in FIG. 6, the etching rate of the main coil insulating layer 31 is larger than that of the auxiliary coil insulating layer 32.

First, the groove having the slope surfaces 32a shown in FIG. 5 is formed in the auxiliary coil insulating layer 32 by ion milling or the like by making use of the aforesaid difference in etching rate, then the groove 31a is formed by etching or the like in the main coil insulating layer 31 exposed through the groove formed in the auxiliary coil insulating layer 32 by using the RIE process or the like, the auxiliary coil insulating layer 32 functioning as a mask. This method makes it possible to form the groove 31a having an inner width that is smaller than a resolution during exposure for a resist, thus permitting manufacture of a thin film magnetic head capable of achieving narrower tracks.

As set forth above, the groove 31a is formed in the main coil insulating layer 31, and the recording portion 14 is formed in the groove 31a. Thereafter, in the same manner as the steps illustrated in FIG. 22 through FIG. 26, a resist layer having a coil pattern is formed on the auxiliary coil insulating layer 32, and the auxiliary coil insulating layer 32 and the main coil insulating layer 31 exposed through the coil pattern are etched by the reactive ion etching process or the like, thereby forming the coil forming grooves 31c and 32c in the auxiliary coil insulating layer 32 and the main coil insulating layer 31.

Thereafter, the coil layer 17 is embedded in the coil forming grooves 31c and 32c by electroplating or the like, and the surfaces of the coil layer 17 and the auxiliary coil insulating layer 32 are planarized by the CMP process or the like. Then, the insulating layers 22 and 24, the second coil layer 23, and the upper core layer 16 are deposited. Thus, the thin film magnetic head shown in FIG. 6 can be fabricated.

For the thin film magnetic head shown in FIG. 8, a manufacturing method similar to that illustrated in FIG. 9 through FIG. 17, or in FIG. 18 through FIG. 20 is used.

More specifically, the gap layer 33 is deposited on the lower core layer 10 first, then the upper magnetic pole layer 36 is deposited in the vicinity of the surface facing a recording medium by using a resist. After that, the coil insulating layer 34 is deposited.

In this embodiment, the gap layer 33 is preferably composed of an inorganic insulating material. As the inorganic insulating material, one material or two or more different materials are preferably selected from among $Al_2O_3$, $SiO_2$, SiON, AlN, and AlSiN.

Alternatively, after the upper magnetic pole layer 36 is deposited, both side surfaces of the upper magnetic pole layer 36 and the gap layer 33 and the surface of the lower core layer 10 may be etched, and the protuberance 10d which juts out from the top of the lower core layer 10 toward the recording portion 14 and which continues to the recording portion 14 may be integrally formed with the lower core layer 10. With this arrangement, the occurrence of light fringing can be further controlled.

Then, a resist layer on which a coil pattern has been formed is deposited on the coil insulating layer 34, and the coil forming grooves 34a are formed in the coil insulating layer 34 by the reactive ion etching process.

Then, a conductive material is embedded by electroplating or the like in the coil forming grooves 34a formed in the coil insulating layer 34 to form the coil layer 17. The coil layer 17 and the coil insulating layer 34 are planarized by the CMP process or the like, then the insulating layers 22 and 24, the second coil layer 23, and the upper core layer 16 are deposited. Thus, the thin film magnetic head shown in FIG. 8 can be fabricated.

In the manufacturing method for the thin film magnetic head in accordance with the present invention described in detail above, the recording portion 14 is formed on the lower core layer 10. After the coil insulating layer is formed on the lower core layer 10 and at the rear of the recording portion 14 in the height direction, or after the coil insulating layer is deposited on the lower core layer 10, the groove is formed in the coil insulating layer, and the recording portion is formed in the groove, a resist layer on which a coil pattern has been formed is deposited on the coil insulating layer.

Subsequently, the coil insulating layer exposed through the coil pattern formed on the resist layer is etched by the reactive ion etching process thereby to concavely form the coil forming grooves in the coil insulating layer. The coil forming grooves have the same configuration as that of the coil pattern formed on the resist layer.

According to the present invention, the coil insulating layer is first deposited on the entire surface of the lower core layer 10, then the coil forming grooves are formed in the coil insulating layer by etching. This eliminates the danger of the coil insulating layer incurring defects, such as cavities.

A conductive material is embedded in the coil forming grooves formed in the coil insulating layer so as to form the coil layer, and the surfaces of the coil layer and the coil insulating layer are planarized by the CMP process or the like. This allows the coil layer to be properly embedded in the coil forming grooves formed in the coil insulating layer.

According to the present invention, when the upper surface of the recording portion 14 is defined as a reference plane, the upper surfaces of the coil insulating layer and the coil layer 17 can be positioned to be flush with the reference plane. Hence, even if the coil layer employs a double-layer construction, the bulge of the insulating layer that protrudes from the upper surface of the recording portion 14 can be controlled to a minimum. With this arrangement, a properly shortened magnetic path can be accomplished and the upper core layer can be pattern-deposited in a predetermined configuration with high accuracy.

In the present invention, the coil layer may be composed of a single layer. In this case, the width of the coil layer will be increased because of the necessity for adding to the number of turns of the coil layer formed in the first layer, leading to a disadvantage in shortening a magnetic path because the magnetic path will be longer than the coil layer composed of two layers. On the other hand, however, since the insulating layer 22 will be the only layer that bulges from the recording portion 14, the upper core layer 16 can be formed in a predetermined configuration with higher accuracy.

According to the present invention, it is possible to etch by ion milling both end surfaces in the track width direction of the recording portion 14 formed on the lower core layer 10 in the step of FIG. 10. Therefore, the present invention makes it possible to reduce the width (=track width Tw) of the recording portion 14 to fabricate a thin film magnetic head capable of achieving narrower tracks. According to the present invention, the track width Tw of the recording portion 14 is preferably set to 0.7 µm or less, and more preferably to 0.5 µm or less.

Thus, according to the present invention described in detail, the coil insulating layer is deposited on the lower core layer and at the rear of the recording portion in the height direction, and the coil layer is embedded in the coil forming grooves formed in the coil insulating layer. With this arrangement, the bulges of the layers from the top of the recording portion can be minimized, so that the magnetic path can be made shorter to reduce inductance, and the upper core layer can be formed with higher pattern accuracy.

Furthermore, according to the present invention, when the junction surface between the recording portion and the upper core layer is defined as a reference plane, the upper surface of the coil insulating layer and the upper surface of the coil layer are made flush with the reference plane. With this arrangement, the film thickness of the coil layer in a stepped portion between the lower core layer and the recording portion can be maximized. Hence, decreasing the width of the coil layer does not result in an increase in the coil resistance value, permitting a shorter magnetic path to be achieved.

According to the present invention, the coil layer preferably has a laminated double-layer construction. The use of the laminated double-layer construction allows the width of the coil layer to be decreased, so that the magnetic path can be made still shorter with a resultant lower inductance.

Even if the laminated double-layer construction is used, when the surface of the track width restriction portion is defined as a reference plane as set forth above, the upper surface of the first coil layer is made flush with the reference plane. Hence, the height from the top of the lower core layer to the top of the second coil insulating layer that covers the second coil layer can be reduced, so that the magnetic path can be shortened. At the same time, the bulge of the insulating layer covering the coil layer from the reference plane will be controlled, allowing the upper core layer to be deposited with higher pattern accuracy.

In the manufacturing method according to the present invention, after the coil insulating layer is deposited on the lower core layer and at the rear of the recording portion in the height direction, the coil forming grooves are formed in the coil insulating layer, and the coil layer is embedded in the coil forming grooves. This arrangement prevents the coil insulating layer from incurring defects, such as cavities.

What is claimed is:

1. A thin film magnetic head comprising:
   a lower core layer;
   an upper core layer; and
   a recording portion that has magnetic pole layers and a gap layer positioned between the lower core layer and the upper core layer at a surface facing a recording medium,
   wherein a coil insulating layer comprising a lower main coil insulating layer and an upper auxiliary coil insulating layer is deposited on the lower core layer and at the rear of the recording portion in a height direction, both the main coil insulating layer and auxiliary coil insulating layer are formed of inorganic materials, the inorganic material of the main coil insulating layer has a higher etching rate than that of the inorganic material of the auxiliary coil insulating layer;
   a coil forming groove is formed in the coil insulating layer; and
   a coil layer for inducing a recording magnetic field to the lower core layer, the upper core layer, and the recording portion is embedded in the coil forming groove.

2. A thin film magnetic head according to claim 1, wherein an upper surface of the coil insulating layer and an upper surface of the coil layer are made flush with each other.

3. A thin film magnetic head according to claim 2, wherein the upper surface of the coil insulating layer and the upper surface of the coil layer are etched surfaces.

4. A thin film magnetic head according to claim 1, wherein, when a junction surface between the recording portion and the upper core layer is defined as a reference plane, the upper surface of the coil insulating layer and the upper surface of the coil layer are positioned to be flush with the reference plane.

5. A thin film magnetic head according to claim 1, wherein an insulating layer is deposited on the coil layer, and a second coil layer is deposited on the insulating layer, the second coil layer being electrically connected to the coil layer and inducing a recording magnetic field to the lower core layer, the upper core layer, and the recording portion.

6. A thin film magnetic head according to claim 1, wherein the gap layer is composed of a nonmagnetic metal material that permits plating.

7. A thin film magnetic head according to claim 6, wherein, for the nonmagnetic metal material, one material or two or more different materials are selected from among NiP, NiPd, NiW, NiMo, Au, Pt, Rh, Pd, Ru, and Cr.

8. A thin film magnetic head according to claim 1, wherein the gap layer is composed of an inorganic insulating material.

9. A thin film magnetic head according to claim 8, wherein, as the inorganic insulating material, one material or two or more different materials are selected from among $Al_2O_3$, $SiO_2$, SiON, AlN, and AlSiN.

10. A thin film magnetic head according to claim 1, wherein the main coil insulating layer comprises a single layer or multiple layers formed of at least one of AlO, $SiO_2$, $Ta_2O_5$, TiO, AlN, AlSiN, TiN, SiN, NiO, NiO, WO, $WO_3$, BN, CrN and SiON, and the auxiliary coil insulating layer is formed of $Al_2O_3$ or $Si_3N_4$.

* * * * *

UNITED STATES PATENT AND TRADEMARK OFFICE
CERTIFICATE OF CORRECTION

PATENT NO. : 6,697,219 B1
DATED : February 24, 2004
INVENTOR(S) : Kiyoshi Sato

It is certified that error appears in the above-identified patent and that said Letters Patent is hereby corrected as shown below:

Column 31,
Line 4, delete "SiN, NiO, NiO, WO," and substitute -- SiN, NiO, WO, -- in its place.

Signed and Sealed this

Eighteenth Day of October, 2005

JON W. DUDAS
*Director of the United States Patent and Trademark Office*